US009559530B2

(12) United States Patent
Lee

(10) Patent No.: US 9,559,530 B2
(45) Date of Patent: Jan. 31, 2017

(54) FAULT TOLERANT WIRELESS BATTERY AREA NETWORK FOR A SMART BATTERY MANAGEMENT SYSTEM

(71) Applicant: NAVITAS SOLUTIONS INC., Hillsborough, NJ (US)

(72) Inventor: Inseop Lee, Pittstown, NJ (US)

(73) Assignee: Navitas Solutions, Hillsborough, NJ (US)

( * ) Notice: Subject to any disclaimer, the term of this patent is extended or adjusted under 35 U.S.C. 154(b) by 160 days.

(21) Appl. No.: 14/512,382

(22) Filed: Oct. 10, 2014

(65) Prior Publication Data

US 2015/0028816 A1 Jan. 29, 2015

Related U.S. Application Data

(63) Continuation-in-part of application No. 13/881,190, filed as application No. PCT/US2011/058503 on Oct. 31, 2011, now Pat. No. 9,293,935.

(Continued)

(51) Int. Cl.
*H02J 7/00* (2006.01)
*H02J 13/00* (2006.01)
(Continued)

(52) U.S. Cl.
CPC .......... *H02J 7/0021* (2013.01); *H02J 13/0003* (2013.01); *H01M 10/441* (2013.01); *H01M 2010/4278* (2013.01); *H02J 13/0075* (2013.01)

(58) Field of Classification Search
CPC .................................................. H02J 7/0021
(Continued)

(56) References Cited

U.S. PATENT DOCUMENTS 5,602,460 A 2/1997 Fernandez et al.
5,631,537 A 5/1997 Armstrong
(Continued)

FOREIGN PATENT DOCUMENTS

CN 1333962 A 1/2002
CN 1512644 A 7/2004
(Continued)

OTHER PUBLICATIONS

Office Action issued Jun. 9, 2015 in Japanese Patent Application No. 2013-536902 and English translation (10 pages).
(Continued)

*Primary Examiner* — Drew A Dunn
*Assistant Examiner* — Zixuan Zhou
(74) *Attorney, Agent, or Firm* — Fox Rothschild LLP; Robert J. Sacco; Carol E. Thorstad-Forsyth

(57) ABSTRACT

A Wireless battery area network permits the wirelessly monitoring and controlling of individual batteries within large-scale battery applications. The system automatically configures its wireless nodes in the network and provides for the linking of a plurality of batteries (10) to a master battery management unit (M-BMU) (100) by establishing a wireless battery area network within a battery pack that include slave units (S-BMU) (210). The entire system may also be controlled by a top level battery management unit (T-BMU) (510). The system and method allows for the monitoring of voltage, current, temperature, or impedance of individual batteries and for the balancing or bypassing of a battery. A communications controller allows for optimization of wireless communications parameters and beamforming.

19 Claims, 19 Drawing Sheets

Related U.S. Application Data

(60) Provisional application No. 61/409,290, filed on Nov. 2, 2010, provisional application No. 61/889,229, filed on Oct. 10, 2013, provisional application No. 61/889,227, filed on Oct. 10, 2013.

(51) Int. Cl.
*H01M 10/44* (2006.01)
*H01M 10/42* (2006.01)

(58) Field of Classification Search
USPC .......................................... 320/112, 116–119
See application file for complete search history.

(56) References Cited

U.S. PATENT DOCUMENTS

| | | | |
|---|---|---|---|
| 5,646,508 | A | 7/1997 | van Phuoc et al. |
| 5,963,019 | A | 10/1999 | Cheon |
| 6,141,763 | A | 10/2000 | Smith et al. |
| 6,351,097 | B1 | 2/2002 | Oh |
| 7,042,352 | B2 | 5/2006 | Kates |
| 7,598,880 | B2 | 10/2009 | Powell et al. |
| 7,619,417 | B2 | 11/2009 | Klang |
| 7,638,979 | B2 | 12/2009 | Vandensande |
| 7,710,073 | B2 | 5/2010 | Yamauchi et al. |
| 7,774,151 | B2 | 8/2010 | Bertness |
| 7,888,912 | B2 | 2/2011 | Morita et al. |
| 8,022,669 | B2 | 9/2011 | Li |
| 2001/0031015 | A1 | 10/2001 | West et al. |
| 2005/0242775 | A1 | 11/2005 | Miyazaki et al. |
| 2005/0275527 | A1 | 12/2005 | Kates |
| 2006/0041680 | A1 | 2/2006 | Proctor, Jr. et al. |
| 2006/0152190 | A1 | 7/2006 | Riemschneider |
| 2006/0192434 | A1 | 8/2006 | Vrla et al. |
| 2007/0029972 | A1 | 2/2007 | Lampe-Onnerud et al. |
| 2007/0091813 | A1* | 4/2007 | Richard .............. H04W 72/085 370/248 |
| 2008/0049653 | A1 | 2/2008 | Demirhan et al. |
| 2009/0066291 | A1 | 3/2009 | Tien et al. |
| 2009/0140694 | A1* | 6/2009 | Zeng ..................... H02J 7/0016 320/118 |
| 2009/0184685 | A1 | 7/2009 | Sim et al. |
| 2010/0007506 | A1 | 1/2010 | Fischer |
| 2010/0019732 | A1 | 1/2010 | Utsumi et al. |
| 2010/0052615 | A1 | 3/2010 | Loncarevic |
| 2011/0115430 | A1 | 5/2011 | Saunamaki |
| 2012/0086390 | A1 | 4/2012 | Lim et al. |
| 2012/0112685 | A1* | 5/2012 | Hartley ................ B60L 3/0038 320/106 |

FOREIGN PATENT DOCUMENTS

| | | |
|---|---|---|
| CN | 101740827 A | 6/2010 |
| JP | H09-7640 A | 1/1997 |
| JP | 2002-272010 A | 9/2002 |
| JP | 2003-304646 A | 10/2003 |
| JP | 2004-120871 A | 4/2004 |
| JP | 2006-108755 A | 4/2006 |
| JP | 2008-198434 A | 8/2008 |
| JP | 2010-081716 A | 4/2010 |
| WO | 2006068429 A1 | 6/2006 |

OTHER PUBLICATIONS

Information about Related Patents and Patents Applications, see section 6 of the accompanying Information Disclosure Statement Letter, which concerns Related Patents and Patent Applications.
International Search Report issued in PCT/US11/58503 dated Feb. 16, 2012 (2 pages).
Written Opinion issued in PCT/US11/58503 dated Feb. 16, 2012 (5 pages).
International Preliminary Report on Patentability for Application PCT/US2011/058503 dated May 7, 2013 (6 pages).

* cited by examiner

FAULT TOLERANT WIRELESS BATTERY AREA NETWORK FOR A SMART BATTERY MANAGEMENT SYSTEM

CROSS REFERENCE TO RELATED APPLICATIONS

This application is a continuation-in-part and claims the priority of U.S. patent application Ser. No. 13/881,190 filed Jun. 7, 2013, which is a national phase of International Patent Application Serial No. PCT/US2011/058503 filed Oct. 31, 2011 which claims the priority of U.S. Provisional Patent Application Ser. No. 61/409,290 filed Nov. 2, 2010, all of which are hereby incorporated in total by reference. This application claims the priority of U.S. Provisional Patent Application No. 61/889,229 tilted "Self organizing network for wireless systems" and U.S. Provisional Patent Application No. 61/889,227 filed "Beamforming and delivery for wireless BMS", both filed on Oct. 10, 2013 and the contents of which is hereby incorporated in total by reference.

BACKGROUND

Field of Invention

The invention relates to a battery management system including a plurality of battery cells in a battery pack in which a wireless battery area network is automatically established between a base station (M-BMU) and a plurality of slave battery cell sensor nodes (S-BMU).

Description of Related Art

Lithium-ion (Li-ion) batteries are growing in popularity as energy storage reservoirs for industrial and automotive applications, high-voltage energy uses (smart grid), such as wind turbines, photo-voltaic cells, and hybrid electric vehicles, and this has spurred demand for safer, higher performing battery monitoring and protection systems. Compared to NiMH (nickel-metal hydride) battery management systems, see, for example, U.S. Pat. No. 6,351,097, Li-ion batteries have better energy-to-weight ratio, offer more efficient storage capacity over multiple charge-discharge cycles, and suffer less charge leakage when not in use. Unlike NiMH batteries traditionally used in high-voltage applications, battery stacks using Li-Ion technology can comprise a large number of individual cells totaling hundreds of cells at different voltages. Each cell must be properly monitored and balanced to ensure user safety, improve battery performance and extend battery life. Therefore, the battery management system (BMS) is one of critical components for small and large-scaled battery applications. Examples of Li-ion battery packs are disclosed in U.S. Pat. Nos. 5,602,460; 5,631,537; and 5,646,508. The main objectives of a BMS are: (1) to guarantee appropriate use of the battery, (2) to guarantee maximum performance of the battery, (3) to monitor necessary battery state data, and (4) to permit diagnosis. The BMS architecture should overcome the three major hurdles of state-of-the-art Li-Ion batteries: life cycle, cost and scalability. For example, in Smart Grid and power plant applications, the battery capacity needs to be as large as a few hundred kWh to a few MWh. However, current BMS architecture is not scalable to handle such a large number of battery cells. More importantly, the complexity and cost of wire harnesses for handling large-scaled battery applications is often not acceptable. Also, conventional battery management systems require data bus isolators such as an opto-coupler based vertical bus, and suffer from high cost and high power consumption. Most research efforts have been focused on improving the cell chemistry aspects. Considering that roughly 30% of the cost of a battery pack is for the BMS and the percentage increases as the battery capacity becomes larger, BMS can be a source of significant cost reduction especially for large-scale Li-Ion battery packs. Very few prior art battery management systems use wireless communication, instead of wired media, or a combination of wired and wireless.

U.S. Pat. No. 6,351,097 describes a battery management system for Ni—Cd and NiMH, while the following U.S. patents discuss possibly relevant battery management systems for Li-Ion or Li-Polymer batteries: U.S. Pat. Nos. 5,963,019; 7,619,417; 7,888,912; 8,022,669; and US 2007/0029972. A useful discussion of secondary battery reuse and protection is found in U.S. Pat. No. 7,710,073.

Lastly, the following U.S. patents are cited for their useful discussions of the current state-of-the-art of wireless communication in battery management systems: U.S. Pat. Nos. 7,598,880; 7,774,151; and US 2006/0152190.

Wireless systems for Battery Management System (BMS), Light Emitting Diode (LED) controller, and Photovoltaic (PV) applications have many attractive features over existing and conventional wired systems. However, because of nature of wireless communication, it requires complicated process to optimize communication parameters. Without Self Organizing Network (SON), it is not feasible to tune a wireless system for the best communication performance in case of mass production.

The best and only existing solution of this issue is using a manual optimization that is not a practical solution for production.

Use of wireless communication in battery pack, LED lighting system, and PV systems may encounter the issue of wave propagation since materials used for those systems are mainly metal, e.g. aluminum and shapes of battery packs, LED lighting system and PV systems are various depending on the application or manufacturer. Known solutions include tuning antenna matching and gain of radio frequency (RF) transceivers manually to work for a specific application. Use of beamforming technology can automatically configure the system for optimal wireless communication conditions regardless of material of system and shape of system design.

SUMMARY

A system and method is disclosed for smartly monitoring and controlling individual batteries within a large-scaled battery application. The system can link a plurality of batteries to a master battery management unit (M-BMU) by establishing a wireless battery area network within a battery pack. The method can include the monitoring of individual battery operations for the voltage, current, temperature, or impedance, and the control of its operation by balancing or bypassing the battery. The monitoring and control of each battery operation is preferably performed by a slave battery management unit (S-BMU) that is mounted directly on each battery cell. State-of-charge (SoC) and state-of-health (SoH) algorithms are executed at the M-BMU. The data protocol for monitoring and controlling cells is transmitted between the S-BMUs and the M-BMU at a predefined periodic rate. Such a wireless battery area network can easily provide the scalability for large-scaled battery applications. In addition, a wireless battery area network can accurately configure battery operation directly for a corresponding battery cell, thus extending the battery pack's life cycle.

Disclosed in this document is a self-organizing network (SON) for wireless systems. During the network's initialization process, the system estimates characteristics of the communication channel and chooses the optimal set of parameters, such as modulation methods, carrier frequency, frequency deviation, signal bandwidth, transmitter and receiver gain setting, transmitter and receiver filter setting, and the like. By doing this, for a given environment and options, selection of the best performing parameters is possible. Also, power up parameters including power up signal pattern, power up signal duration, and power up signal level can be optimized during initialization process.

Use of beamforming technology can automatically configure the system for optimal wireless communication conditions and wireless power up conditions regardless of material of system and shape of system design.

Use of wireless communication in battery pack, LED lighting system, and PV systems also requires wireless power up/down features for efficient energy management. Wireless power down can be implemented by simple wireless communication, but wireless power up need to have a wireless power transfer system. The idea of SON and beamforming also can be used for wireless power up/down system to improve power up/down sensitivities.

The invention will be further understood by reference to the following drawings.

DETAILED DESCRIPTION OF THE INVENTION

During the course of this description, like numbers will be used to identify like elements according to the different figures which illustrate the invention.

In general, all Battery Management Systems (BMS) are implemented using an electronic circuit board. The BMS monitors the voltage, the current, impedance, and the temperature of each cell. Since a BMS has to monitor each and every Li-Ion battery cell, the typical prior art BMS board needs to be wired to every Li-Ion cell. This can be a problem if the number of Li-Ion battery cells to be monitored needs to increase. According to the prior art, hierarchical BMS architectures are often used, however, the use of BMS architectures also calls for an increase in the number of BMS boards and the overall cost. When the number of Li-Ion cells increases to a few hundred, or up to thousands, which is often the case for electric vehicle (EV) or power plant applications, the wire harness becomes a serious problem. Thus, one of the biggest issues of BMS implementation is wiring. To reduce this issue, a star topology, a ring topology, or a daisy chain topology have been introduced. These topologies may reduce wiring problems, but they cause optimization problems because all batteries are not configurable. For the best optimization of battery life and performance, it is ideal to control individual batteries.

Figure 1:
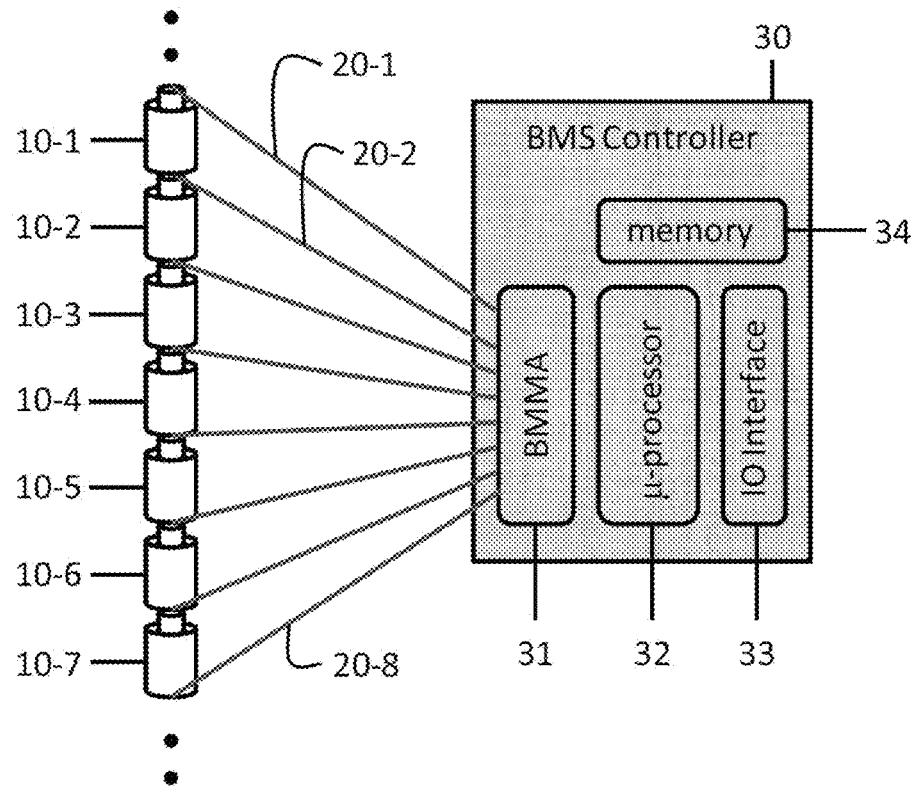
FIG. 1 is a centralized BMS topology schematically illustrating a portion of the architecture of a conventional prior art battery management system.

FIG. 1. shows a fully centralized prior art wired BMS architecture according to the prior art. Each BMS Controller (30) includes a μ-Processor (32), an IO Interface (33) a memory (34) and a BMA (35). This is the simplest architecture where there is a single BMS controller board (30) and wires (20-1, . . . , 20-8) are connected to each of the battery cells (10-1, . . . , 10-7). However, the wiring can be a problem for a large capacity or high voltage battery pack.

For example, a battery pack with 100 cells in series must have 101 wires running between the cells (10) and a centralized BMS (30). All of those wires (20) can be hard to route. Worse, the more wires there are in a battery (10), the greater the risk that one of them will become the path for a plasma discharge between the two poles of the battery (10).

Figure 2:
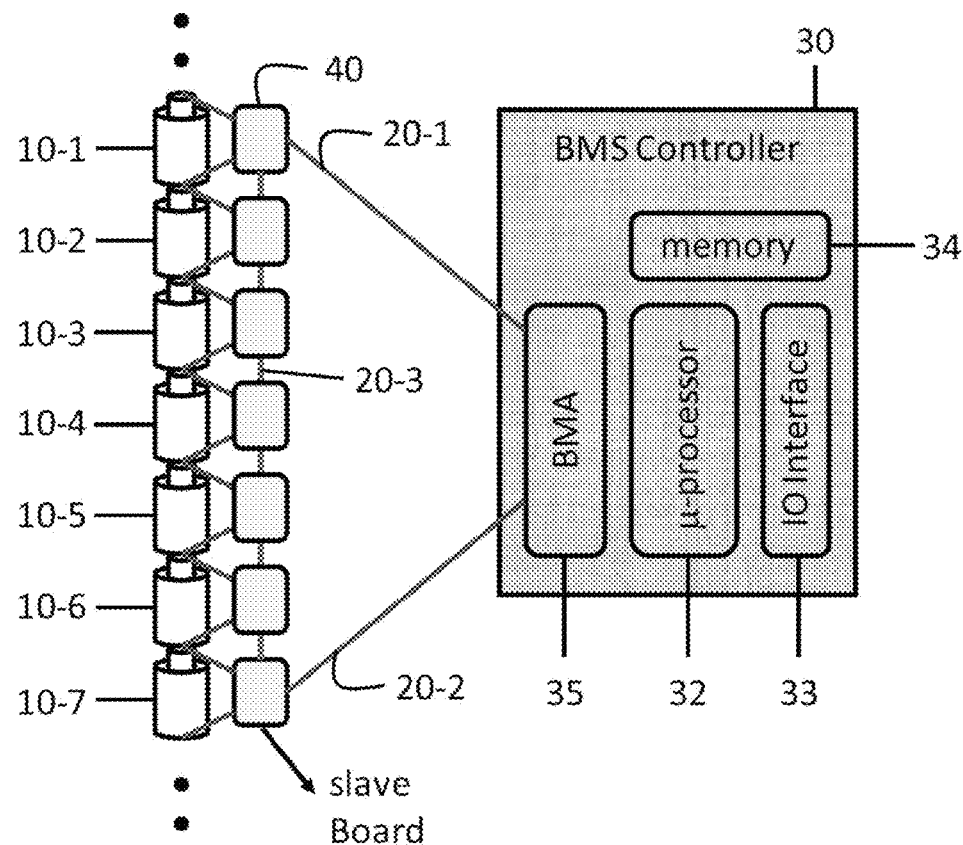
FIG. 2 is a distributed BMS topology schematically illustrating a portion of the architecture of a conventional prior art battery management system showing the use of slave units.

FIG. 2. shows another prior art fully distributed architecture where BMS boards (40) are mounted on battery cells (10), and the BMS boards (40) are connected together in a single daisy chain (20-1, 20-2, 20-3) to the central BMS controller (30). The wiring problem is resolved in this topology but a single BMS board (40) failure will lead to an entire battery pack failure and measurement time is proportionally increased with the number of stacked batteries (10).

Figure 3:
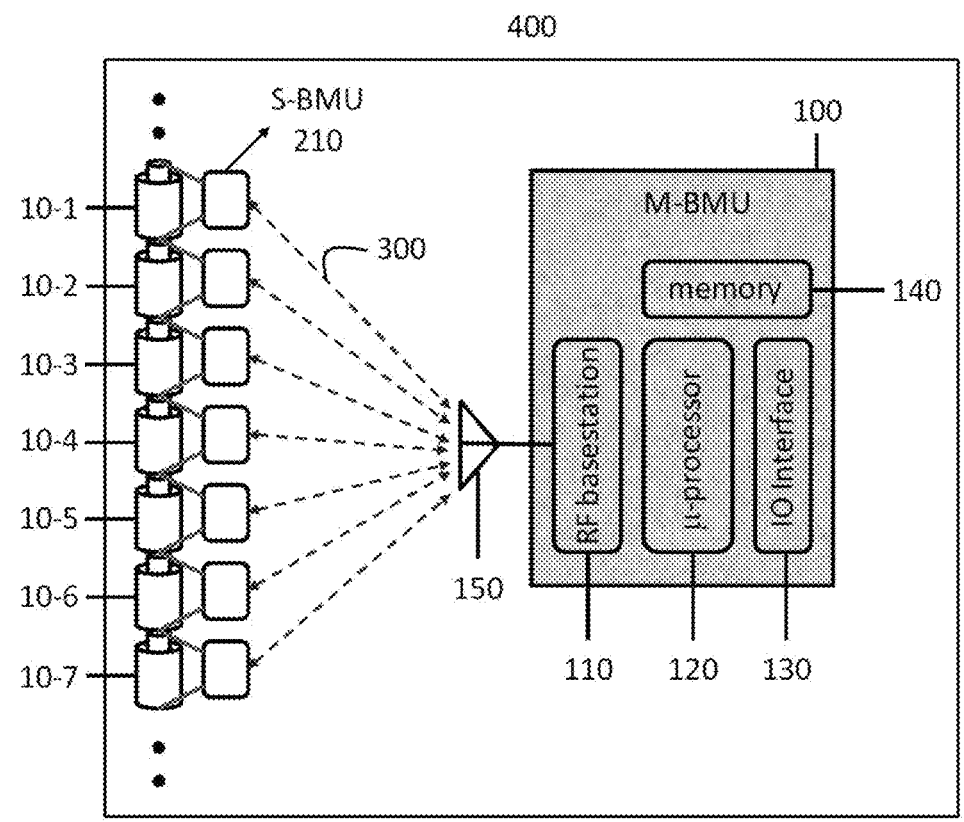
FIG. 3 illustrates the method and system topology of a wireless battery area network (WiBaAN) according to the preferred embodiment of the present invention.

FIG. 3. illustrates the proposed wireless battery area network (WiBaAN) according to the preferred embodiment of the invention where a slave battery management unit (S-BMU) (210) mounted on each battery cell (10) is wirelessly (300) connected to a single master battery management unit (M-BMU) (100). The proposed architecture has major advantages over all conventional prior art BMS architectures.

The WiBaAN (400) consists of a single M-BMU (100) (for a large battery pack size with less than 500 battery cells) and a plurality of S-BMUs (200) for individual battery cell (10). Each M-BMU (100) includes an RF radio (110), antenna (150), microprocessor (120), memory (140), and various interfaces (130). Alternatively, the RF radio (110), microprocessor (120), and parts of memory (140), power management unit, and interfaces (130) can be integrated on a single silicon chip or die. Each S-BMU (210) includes analog sensors (240), an RF radio (220), on-board antenna (230), and battery control logic (250). Alternatively, the analog sensors (240), RF radio (220), and battery control logic (250) can be implemented on a single silicon chip. The smart BMS (400) incorporated with the WiBaAN is able to communicate with each individual battery cell (10) and monitor actual operating conditions such as its voltage, current, impedance, and ambient temperature. It is an essential part of the BMS (400) to monitor individual battery cell (10) conditions. Effective communication bandwidth in the WiBaAN is entirely dependent on the size of battery pack (10) (i.e. the number of batteries in a pack) and the system refresh rate (i.e., CAN-bus update rate in EV) of the applications. The WiBaAN provides easy interface between individual battery cells (S-BMU) (210) and a BMS controller (M-BMU) (100), and offers flexible expansion of the effective communication bandwidth by adding more packs and performing the reconfiguration of the wireless interface. Information concerning the operating condition of individual battery cells (10) in real time is incorporated with information about the battery specifications from the manufacturer and allows the system to control the state of charge (SoC) and tolerance conditions of each battery cell (10) and to ultimately prolong battery life or increase battery cycle time or both. In addition, it allows the BMS to intelligently equalize cell balancing (251) in a cell pack (10) so that it can significantly reduce the cell balancing time. Since a wireless link inherently provides voltage-independent data transmission, then the WiBaAN does not require isolators for the communicating of data between S-BMUs (200) and an M-BMU (100).

The sheer numbers of inaccessible and unattended S-BMUs (210), which are prone to frequent failures, make topology maintenance a challenging task. Hundreds to thousands of S-BMUs (200) can be deployed throughout a WiBaAN field (500). They are generally deployed within ten feet of each other, so that node densities may be as high as 100 S-BMUs/m$^3$, or even higher. Deploying a high number of densely packed nodes requires careful handling and special topology maintenance. However, while device failure is a regular or common event due to energy depletion or destruction in wireless sensor nodes, the S-BMUs (200) within the WiBaAN (500) rarely fail due to directly supplied power by the mounted battery. Since it is challenging to have highly mobile nodes in any WiBaAN application, WiBaAN does not usually experience varying task dynamics. In addition, it is not a good target for deliberate jamming. The disclosed WiBaAN topology is not prone to frequency changes after deployment.

Figure 4:
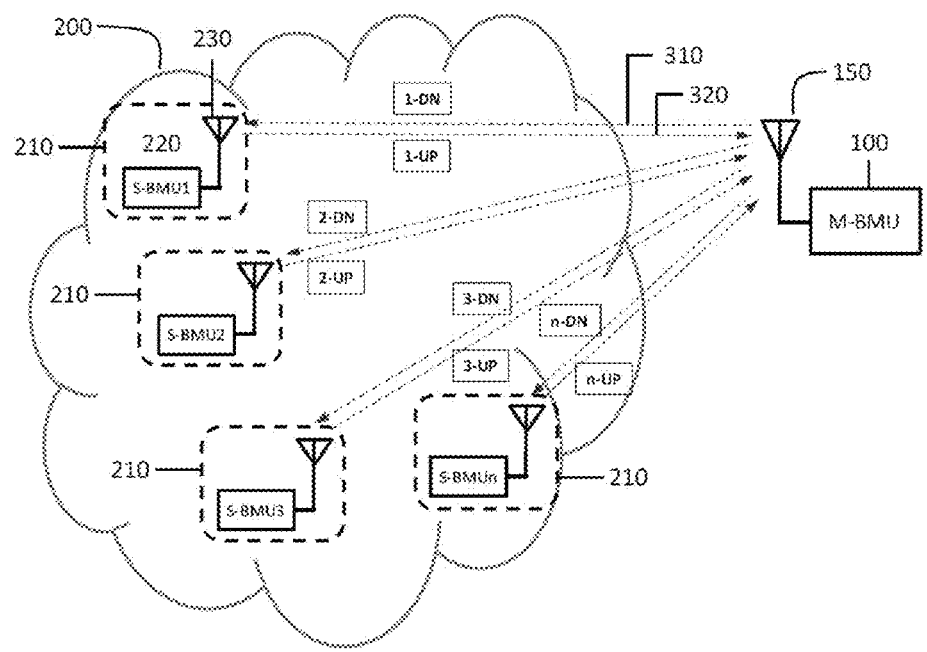
FIG. 4 illustrates the wireless access method of the present invention which discloses a time division half-duplex method for accessing S-BMU nodes based on a predetermined period and sequence in a WiBaAN.

WiBaAN can be a duplex wireless communication system, but FIG. 4. depicts a half-duplex system as one of the preferred possible WiBaAN topologies. The WiBaAN consists of one node with a single point-to-point link to a second node. The choice of which central node is the M-BMU (100) and the other nodes are the S-BMUs (200). The network may use non-broadcast multi-access communications, where the M-BMU (100) of the network only addresses individual S-BMUs (210) with each communication. The WiBaAN contains 'n' number of S-BMUs (200) and a single M-BMU (100) as a hub. The maximum number of 'n' in a WiBaAN can be determined by considering the communication packet size, the effective WiBaAN bandwidth, and the required system refresh rate. Given the example of an electric vehicle (EV), it is assumed that the packet size of the down-/upstream data is PS-bit, the WiBaAN maximum data rate is DR-bit/second, and CAN-bus refresh rate is RR-seconds, then the maximum number of S-BMUs (200) in a WiBaAN domain should be less than DR*RR/PS.

Figure 5:
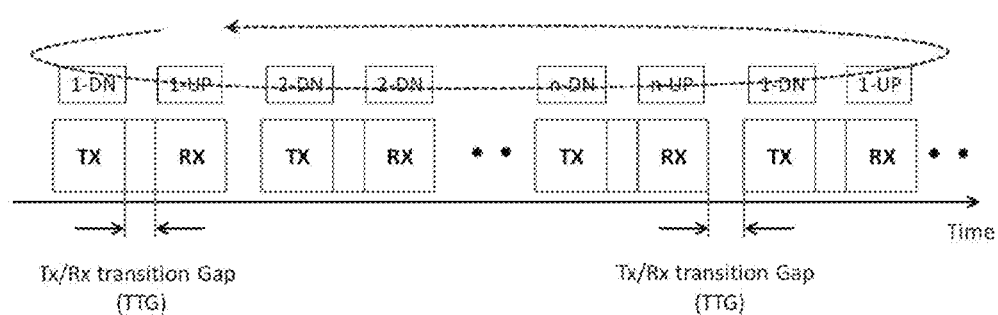
FIG. 5 is a timing diagram illustrating communication between S-BMUs and an M-BMU in a WiBaAN.

FIG. 5. illustrates a data transmission (access) method based on an established time division multiplex protocol (TDM) to communicate between an M-BMU (100) and a number of S-BMUs (200) within a WiBaAN. TDM has an advantage in WiBaAN because there is an asymmetry between the uplink and downlink data rates, and the uplink and downlink paths are likely to be very similar. TDM uses a single frequency spectrum to transmit signals in both downstream and upstream directions. The TDM system requires a guard time between transmit (downlink) and receive (uplink) streams. The Tx/Rx transition gap (TTG) is a gap between downlink and uplink transmission. This gap allows time for the M-BMU (100) to switch from transmit mode to receive mode and the S-BMUs (210) to switch from receive mode to transmit mode.

Figure 6:
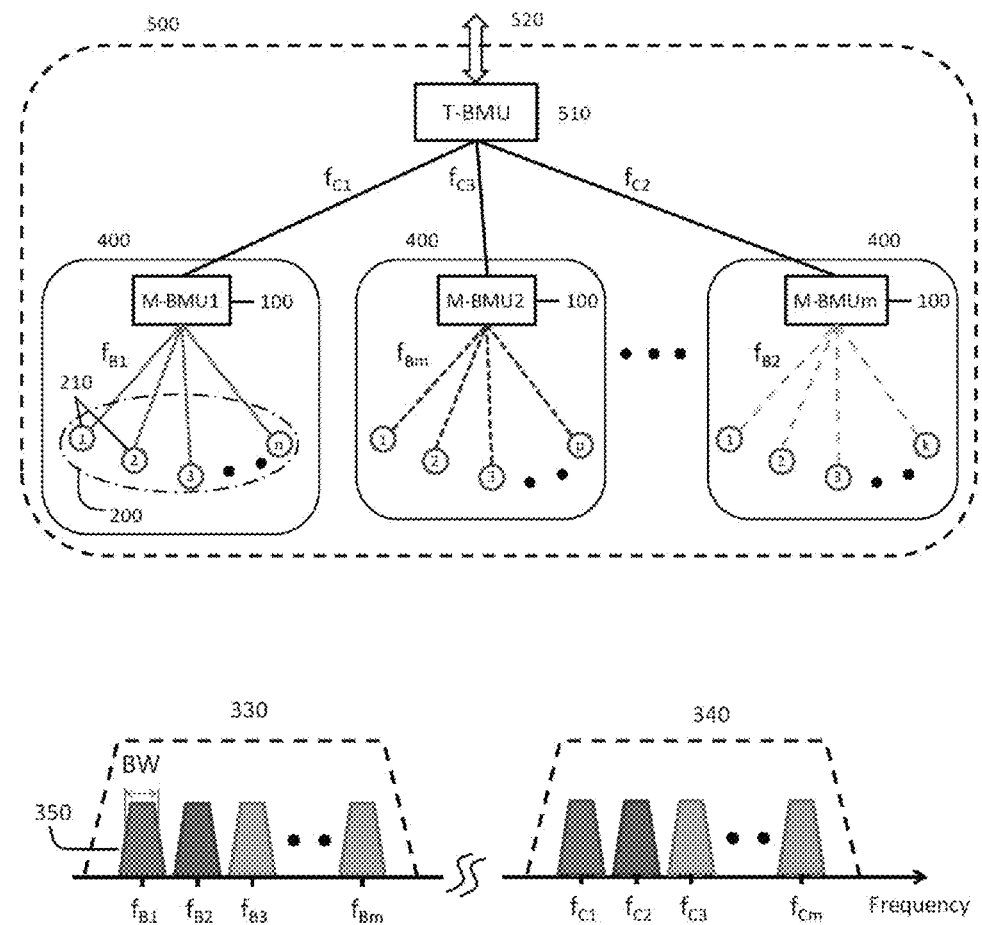
FIG. 6 illustrates the hierarchical architecture of a WiBaAN based on a hybrid multiplexing communication network in which the WiBaAN consists of several battery banks and in which a battery bank comprises one M-BMU and a plurality of S-BMUs, for large-scale battery applications.

FIG. 6. depicts a hierarchical WiBaAN architecture (500) based on a hybrid multiplexing communication network. It consists of three different levels of battery controllers: T-BMU (510), M-BMUs (100), and S-BMUs (200). A single top-level battery management unit (T-BMU) (510) is the top level node of the battery management system (500), and includes RF radio, antenna, microprocessor, controller, peripheral interface units, and power management units similar to the M-BMUs (100). T-BMU (510) controls multiple M-BMUs' (100) operations, collects the data from the M-BMUs (100), and communicates with a main system through external interfaces (520) such as a controller area network (CAN or CAN-bus) (520). The wireless communication network between a T-BMU (510) and multiple M-BMUs (100) is preferably established by frequency division multiplexing (FDM) techniques in which each channel uses a different carrier frequency signal ($f_{Ci}$) (340). Each higher node of the architecture operates with a longer interval of control and execution time than its immediately lower layer. Each branch is organized with an M-BMU (100)

and a number of S-BMUs (200) forming a battery management 'bank' (400). Each bank (400) establishes a FDM network ($f_{Bi}$) (330) with adjacent battery management banks so as to suppress the interference between adjacent RF communications, whereas time division multiplexing (TDM) is used to communicate between each M-BMU (100) and a plurality of S-BMUs (200) within a battery management bank, as shown in FIG. 5. The size of a battery management bank is determined by parameters such as the number of S-BMUs (200), data rate, specification of update battery data rate, etc. For example, if there is a limited number of S-BMUs (200), for example less than 700, with a data rate of 1 Mb/s at 100 msec update data rate we will see the following. In that condition, only one battery bank would be needed to manage all the WiBaAN entities, and an M-BMU (100) can calculate each S-BMU's (200) SoC/SoH and control whole entities based on their monitoring data. If the entire system included more than one battery bank and requires a hierarchical architecture, as shown in FIG. 6, then each M-BMU (100) includes a microprocessor to calculate the SoC/SoH for each S-BMUs in a battery bank, and transfers SoC/SoH data to the T-BMU (510) to control BMS operations. Otherwise, that T-BMU can calculate all the S-BMU's SoC/SoH with microprocessors, in which case the M-BMUs (100) play the role of data transfer gateway.

Figure 7:
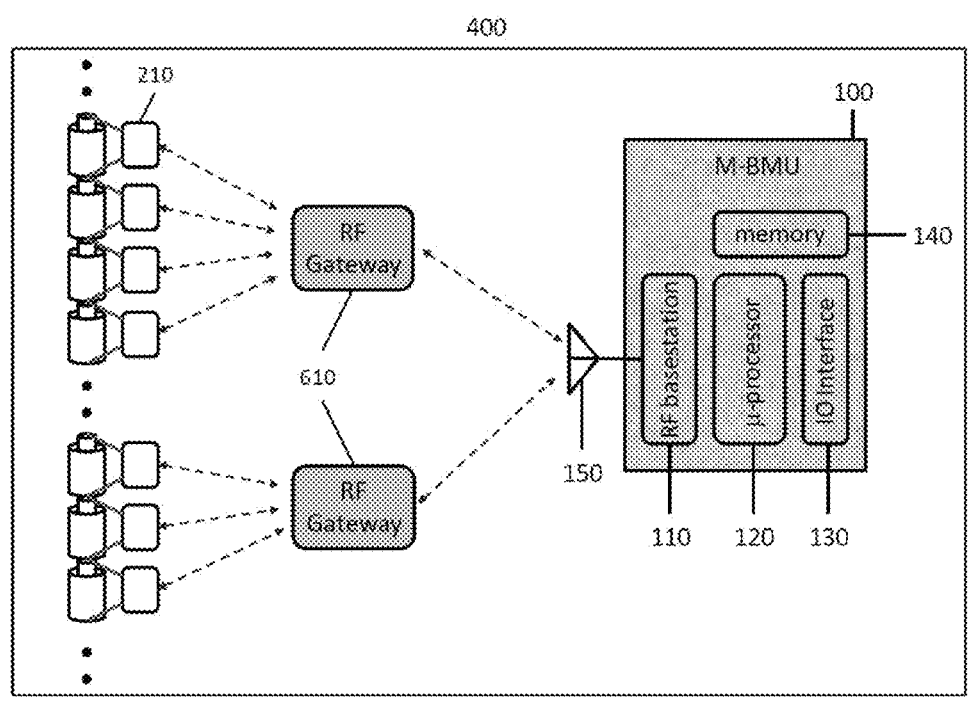
FIG. 7 illustrates an alternative embodiment of the present invention employing RF repeaters.

FIG. 7. shows a modified and practical topology for a WiBaAN in which a network (400) has one or more wireless repeaters (or RF gateways) (610) between the M-BMU (100) and the peripheral S-BMU nodes (200). The RF gateways (610) are used to extend the maximum transmission distance of the point-to-point links between the M-BMU (100) and the S-BMU nodes (210) beyond that which is supported by the transmitter power of the M-BMU (100) or beyond that which is supported by the physical package upon where the WiBaAN is deployed.

Figure 8:
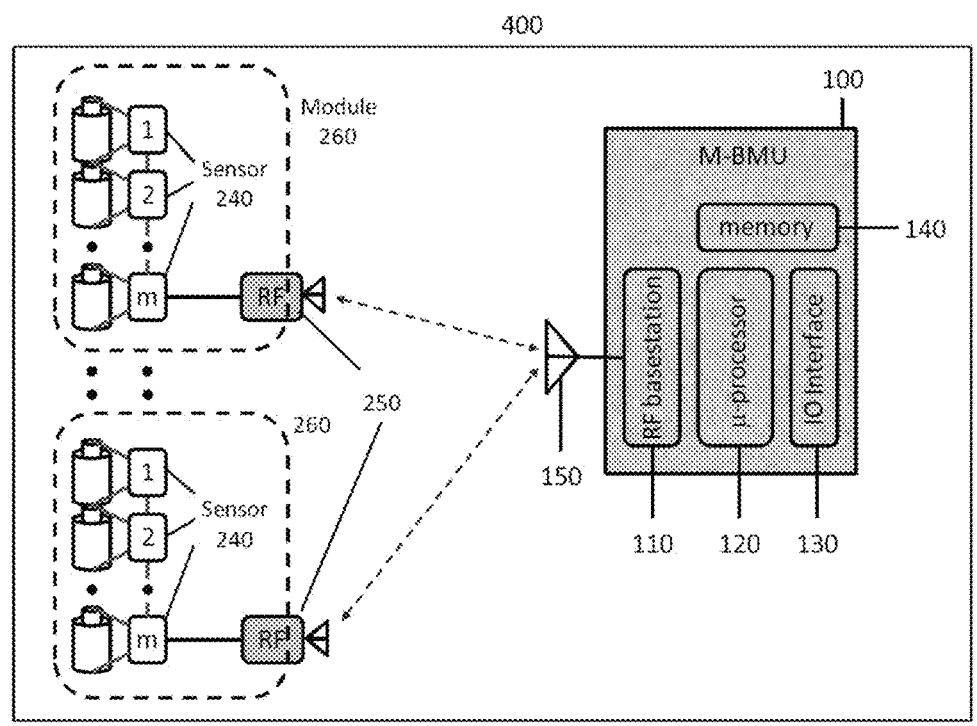
FIG. 8 illustrates another alternative embodiment of the present invention employing sensors connected to the battery pack.

FIG. 8. illustrates another alternative embodiment of a modified WiBaAN topology in which a physical sensor unit (240) is mounted on a battery cell (10) and the cells (10) can be stacked up to a predetermined number (m) of battery cells (10) in one string. Two sets of serial ports on a sensor unit (240) enable the sensor units (240) to be daisy chained or connected by other digital interfaces like CAN. Communication with the M-BMU (100) is carried out on the lowest level through a RF radio (250). This topology can be used to simplify wireless communication links and reduce the number of required RF radios. It may be also useful to overcome the physical complexity of battery pack structures in which the modularization (260) of a battery pack (400) is developed.

Figure 9A:
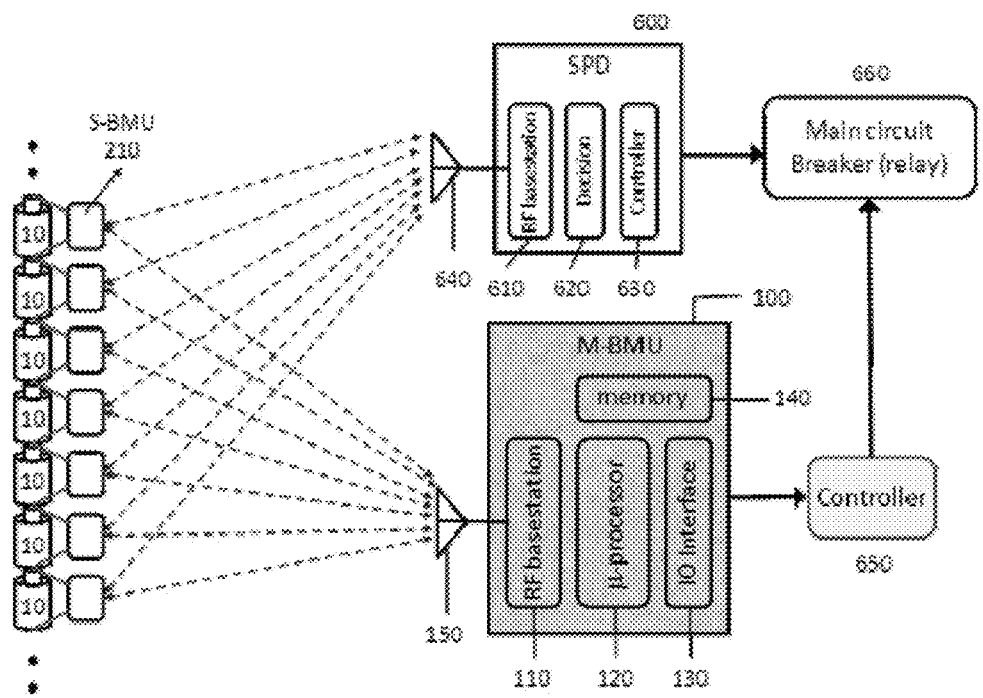
FIG. 9(a) illustrates a secondary battery protection device in the context of a WiBaAN.
Figure 9B:
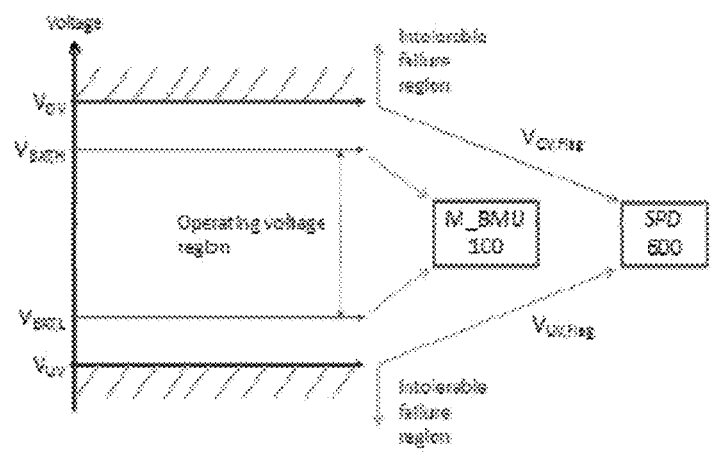
FIG. 9(b) is a voltage diagram illustrating the voltage range where the M-BMU normally operates and also the failure region where the SPD takes over control.

FIG. 9(a) is a block diagram of a wireless secondary battery protection (SPD) scheme for a BMS (100). Secondary protection refers to a mechanism for protecting a battery pack when the primary protection mechanism through battery management system (BMS) (100) fails to operate. In order to achieve secondary protection, the voltage and temperature of each cell in a battery pack (10) needs to be monitored. When the operating condition is out of the safe zone, an appropriate fault signal is delivered to the protection circuit, which operates independently of the main BMS or controlling microprocessor. In a WiBaAN, as shown in FIG. 9(b), when a cell battery (10) is operating in a condition that is not considered to be safe, the master BMS (100) makes an action to prevent further damage to the battery cell (this is its primary protection). For example, a master BMS (100) can communicate with a main protection circuit or circuit breaker to disconnect the battery circuit. Accordingly in the alternative embodiment of the present invention, the protection circuit (600) is also equipped with wireless communication capability. When, for any reason, the master BMS (100) cannot be responsive to the fault signals from slaves (200), the slaves (200) communicate their flag signals (over voltage or under voltage flag) directly with the secondary protection device (SPD) (600) through a wireless channel to protect the battery cells (10). The SPD (600) disclosed includes an RF base station (610), a decision device (620), a controller (630), and an RF antenna (640). The SPD (600) is able to control the main relay or circuit breaker (660) to cut off the main charging/discharging cable to the battery pack (10). While conventional batter pack architectures sometimes employ secondary protection devices with additional wire harnesses, the disclosed WiBaAN only requires an SPD (600) without the additional burden of a wire harness. Moreover, an S-BMU (210) unit can be used for the SPD (600) in a WiBaAN.

Figure 10A:
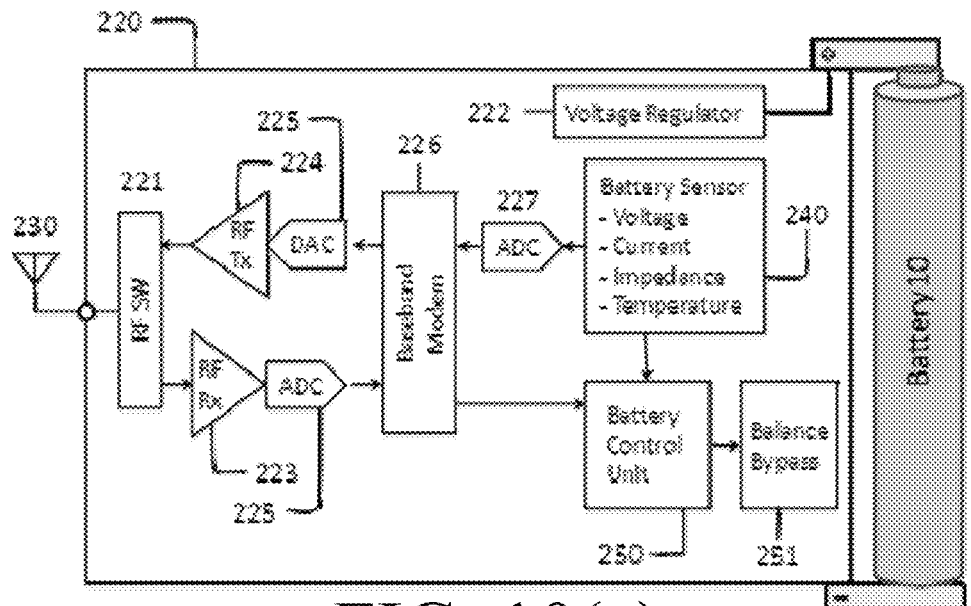
FIG. 10(a) illustrates a block diagram of an S-BMU attached directly to a battery cell.

FIG. 10(a) is a block diagram showing an S-BMU (210) mounted on a battery cell (10). The S-BMU (210) comprises: a battery sensor unit (240), a complete RF radio (220), an on-board antenna (230), a power management unit (222), a digital signal processing unit (226), and a battery control logic (250). The S-BMU (210) can be implemented with a single silicon chip solution (220) including all the key functional units except an on-board antenna (230) and a crystal. The battery sensor unit (240) includes analog sensors for measuring the voltage, current, impedance, or temperature of the battery cell (10), as well as an analog data multiplexor and high-resolution analog-to-digital converter (227). One of the key features of an S-BMU (210) is to provide a controllability of a battery's balancing and bypassing (251).

Figure 10B:
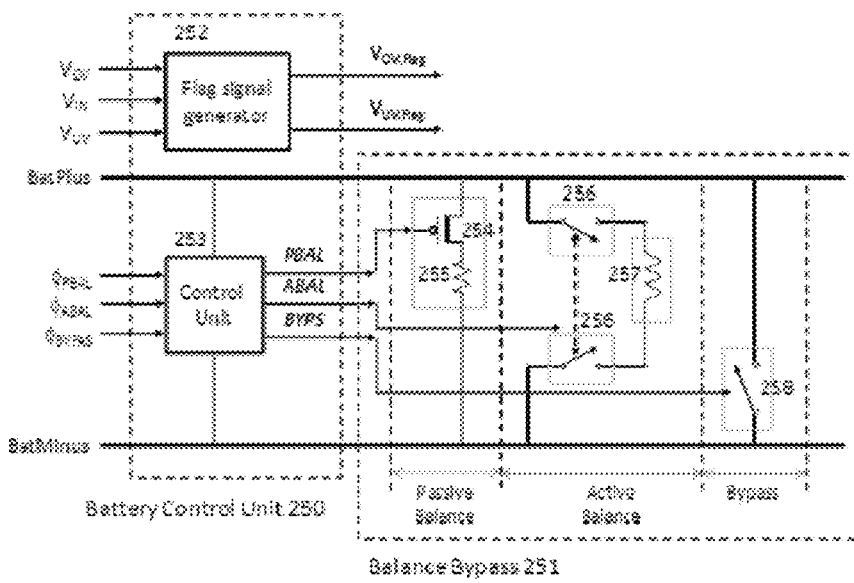
FIG. 10(b) is a detailed block diagram of the battery control logic circuit and a balance and bypass circuit shown in FIG. 10(a) above.

FIG. 10(b) is a block diagram of a battery control logic circuit (250) and a balance and bypass circuit (251). The battery control logic circuit (250) includes an over-voltage and under-voltage flag generation unit (252) and a balance operation control unit (253) for producing the following control signals: passive balance (PBAL); active balance (ABAL); or, bypass control (BPAL). The control commands of balance and bypass are transferred from the M-BMU (100) to the corresponding S-BMU (210), interpreted at the slave baseband modem (226), and delivered to the control logic (250). Passive balance can be implemented several ways including either: 1. at the chip-level with a power MOSFET (254) and a passive resistor (255); 2. at the board-level with external power switch devices and passive elements; or, a combination of internal and external approaches. The active balancing function can be implemented on-board based upon a unique preferred selective cell equalization technique (251). The selective cell equalization technique is performed using an M-BMU (100)'s SoC data. First, the M-BMU (100) delivers an active balance command to the S-BMU (210) that has the highest charging voltage. Second. the extra charge from the S-BMU (210) is delivered to a primary transformer through switch (256) and a secondary transformer (257). Third, the M-BMU (100) selects the battery cell that has the lowest charge and accomplishes active balance by turning the switches (256) on which cause charge redistribution to flow from the primary to the secondary of transformer (257). The control unit (253) is also able to bypass any failed batteries in a series of a battery stacks by controlling the ultra-low on-resistance relay switch (258). Since an S-BMU (210) is mounted on a battery cell (10), directly measured temperature and current data can be mapped into battery environment and operations.

There are various standards for short-range wireless data communication known in the art such as Near Field Communication (NFC), Radio Frequency Identification (RFID), Zigbee, or Bluetooth. They have been successfully deployed in many areas because of low manufacturing cost and small footprints. However, the WiBaAN requires application-driven specific design and specifications over the above mentioned standards because of its demand for variable high-rate data communication and the handling of very dense populations (distribution) of network sensors (200). Even if it resides inside a battery pack covered by a metal case, thereby preventing potential electromagnetic interference (EMI) and electromagnetic compatibility (EMC), the problem remains of highest importance. In addition, the following features should be considered for WiBaAN: variable RF power output, omni-directional built-in antenna, ultra-low-power operation, secure QoS, robust operation over wide temperature range, automatic identification of battery distribution, and automatic mode control.

Figure 11:
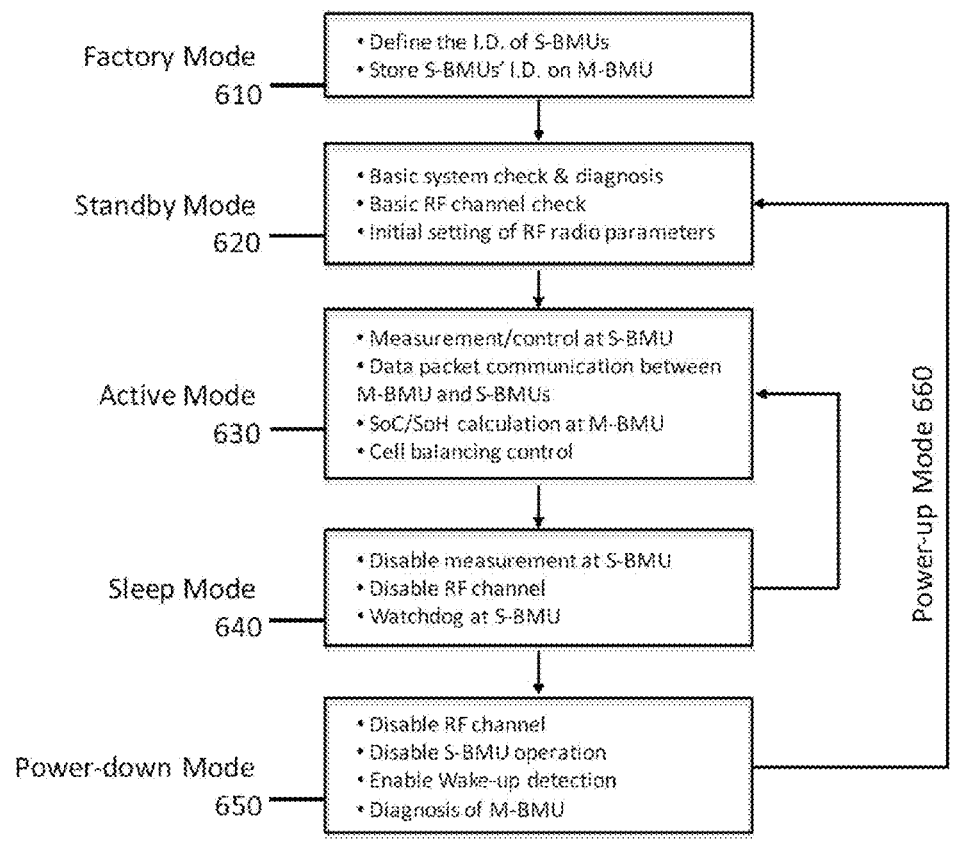
FIG. 11 is a flow diagram of the operation modes of a battery management system according to the present invention.

FIG. 11. illustrates the basic functional flow of the steps required for operating the preferred WiBaAN technology. This is a five-mode process. The factory mode (610) of a WiBaAN is defined with the configuration of each S-BMU's identification (I.D.), by either automatic or scanning approaches, and then it stores all the S-BMUs' I.D.s and battery topology on M-BMU's memory look-up space. When the battery pack (10) is equipped in a system, the WiBaAN devices convert the mode from Factory to Standby mode (620). It attempts to cause both a plurality of S-BMUs (200) and an M-BMU (100) to enter Standby mode (620), which will perform basic system checking and diagnosis, basic RF communication channel checking, and the initial setting of RF radio parameters such as carrier frequency, LO frequency, signal bandwidth and gain, and so on. In Active mode (630), all of the S-BMUs (200) are monitoring their battery operation conditions and communicating with an M-BMU (100) to transfer battery monitor data or to control the battery operation by balancing or bypassing. The M-BMU (100) collects each battery's data sequentially based on predetermined period and sequence, and calculates the SoC and SoH of each battery and its pack. After one S-BMU (210) completes communication with an M-BMU (100), it automatically enters Sleep mode (640), while the next neighboring S-BMU (210) readies to move into Active mode (630). In Sleep mode (640), the S-BMU (210), and the unused building blocks in the RF radio are powered down to save power. After a predetermined time period defined by a watchdog, the S-BMU (210) starts to listen to the packet from the M-BMU (100) in order to wake up again. When the main power switch of the battery pack is turned down, the battery pack enters a power-down mode (650), which disables all the S-BMU (210) functions. During that period the M-BMU (100), which is powered by a dedicated battery, performs diagnosis of the system. A power-up signal (660) generated by M-BMU (100) drives all the S-BMUs (210) to Standby mode (620) from Power-Down mode (650).

Since the disclosed embodiments use wireless communication between sensor modules and a monitoring module, it is possible to diversify communication channel between these two points. In contrast to the disclosed embodiments, a wired system cannot have any diversity between sensing modules and a monitoring module. Diversity generally means utilizing two or more communication channels to improve the reliability of message transmission in communications.

In traditional wired BMS and fault tolerant systems, diversity is achieved by physically doubling the hardware components of the system. Each battery is connected to at least two sensing modules each (i.e. sensors). The sensing modules are connected to monitoring module which monitors batteries. Therefore, the sensing module devices are diversified and the contacts between the batteries and the sensing modules are diversified.

Figure 12:
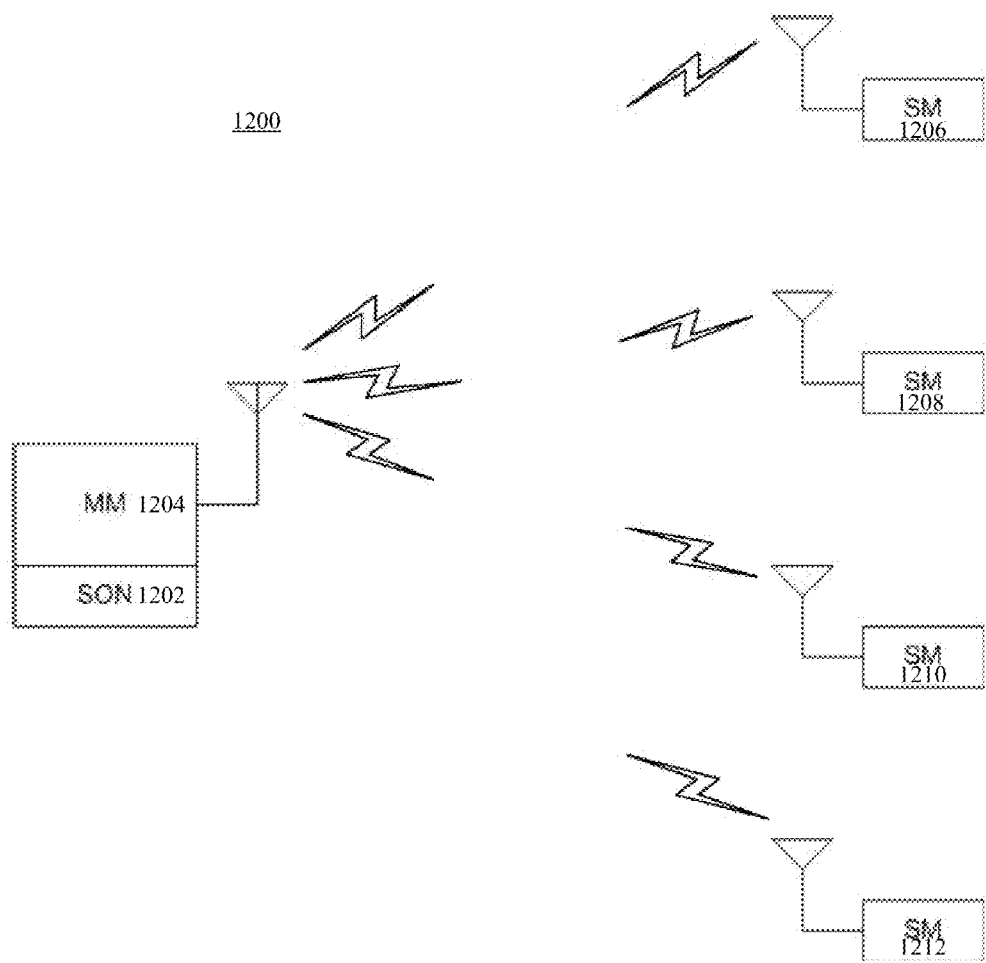
FIG. 12 is a block diagram of an example centralized network architecture.

There are three architectures in the self-organizing network (SON), a centralized network architecture, a distributed network architecture, and a hybrid network architecture. In FIG. 12, an example of a centralized network architecture 100 is shown. In the example shown in FIG. 12, the SON controller (1202) is implemented at a master module (MM) (1204). The function of MM is coordinating transactions between MM and slave modules (SM). The MM 1204 controls communications and functions of SM's. The MM (1204) collects and processes data for the SON (1202). After optimizing various parameters, MM (1204) configures all the slave modules (SM) (1206-1212). An example set of parameters may be such as modulation methods, carrier frequency, frequency deviation, signal bandwidth, transmitter and receiver gain setting, transmitter and receiver filter setting, and the like. By doing this, for a given environment and options, selection of the best performing parameters is possible. Also, power up parameters including power up signal pattern, power up signal duration, and power up signal level can be optimized during a system initialization process.

Figure 13:
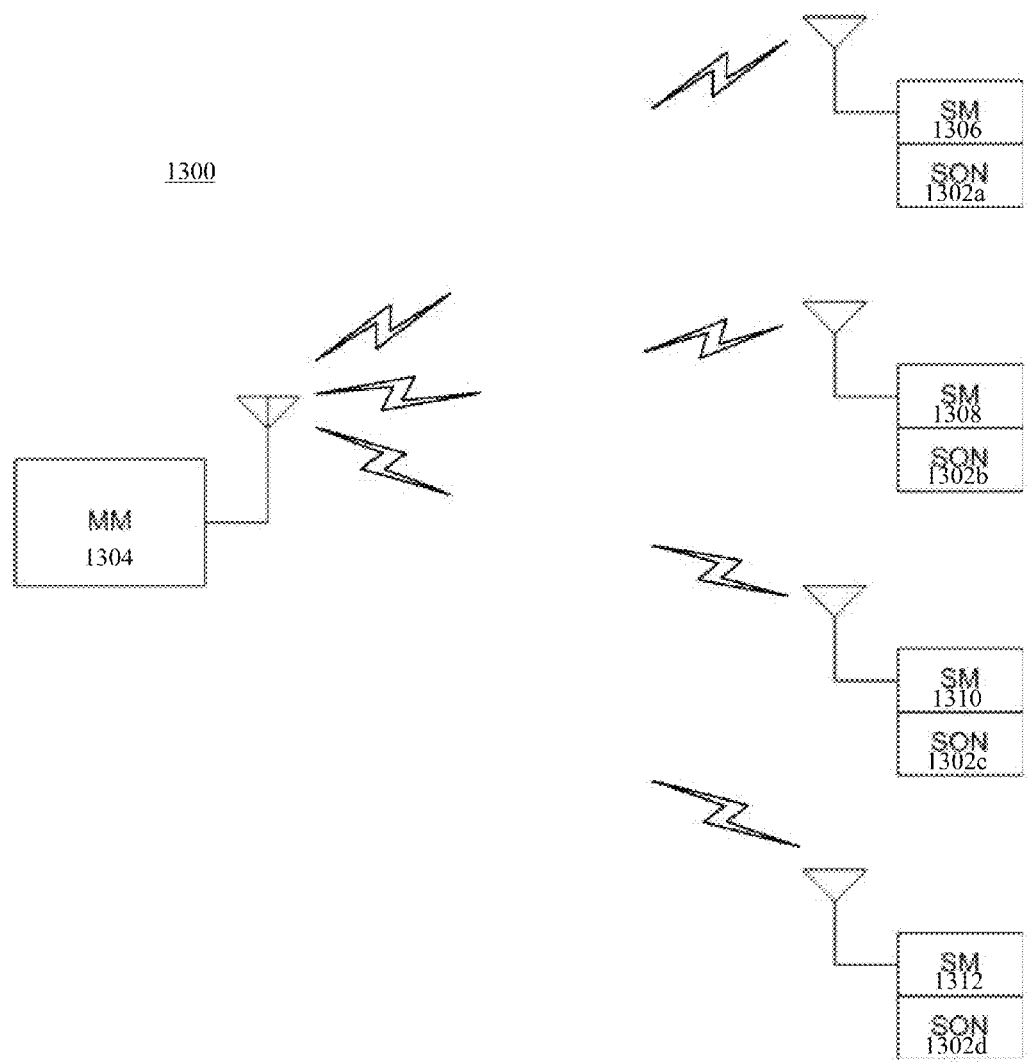
FIG. 13 is a block diagram of an example distributed network architecture.

A distributed network architecture (1300) is given in FIG. 13. In distributed network architecture (1300), as opposes to a centralized network architecture (1200) of FIG. 12, all the SON processing is implemented in SON controllers (1302a-1302b), collocated with the SM (1306-1312). The MM 1304 remains as the master module of distributed network architecture (1300).

Figure 14:
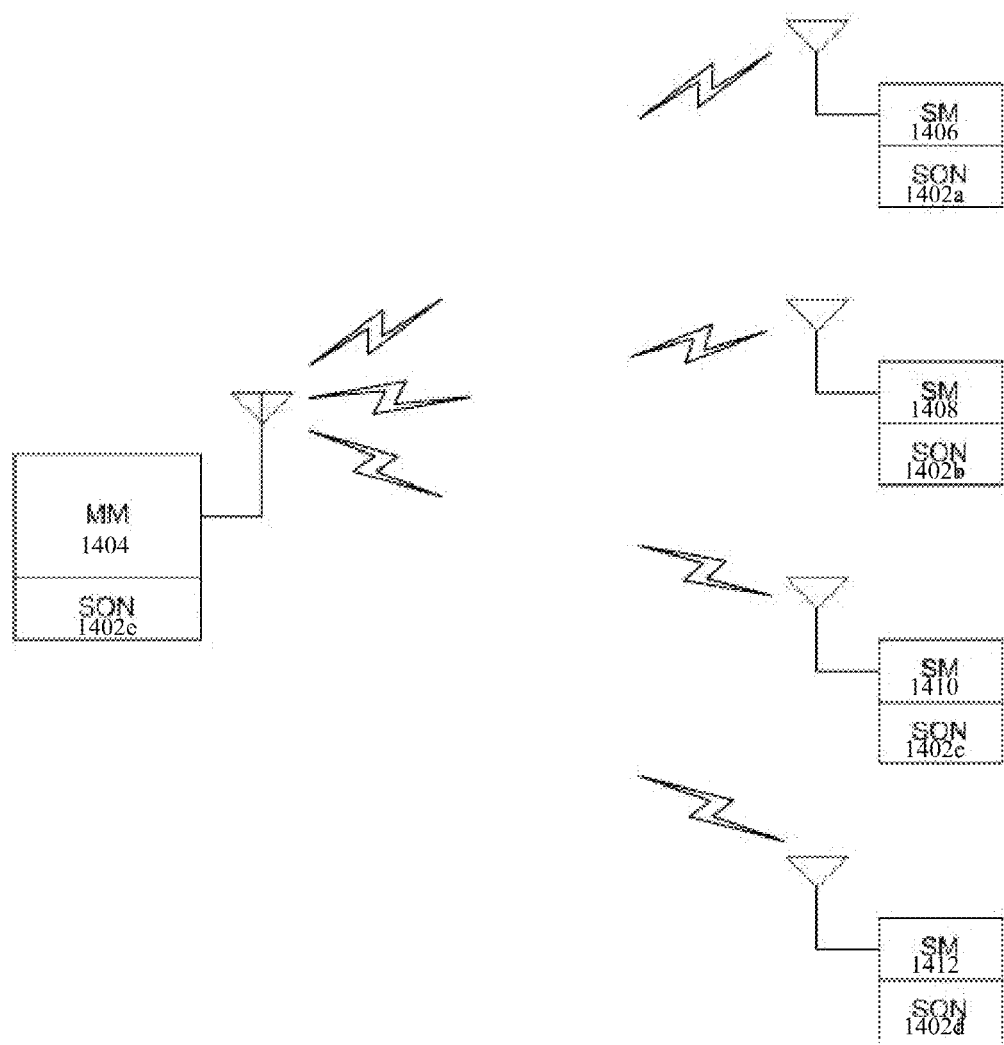
FIG. 14 is a block diagram of an example hybrid network architecture.

As an alternative of above two architectures, a hybrid network architecture (1400) is shown in FIG. 14. The SON function is implemented in SON controllers (1402a-1402e) collocated with both the MM (1404) and the SM (1406-1412) in a hybrid architecture. An advantage of hybrid architecture is that optimization can be done for uplink and downlink separately.

Figure 15:
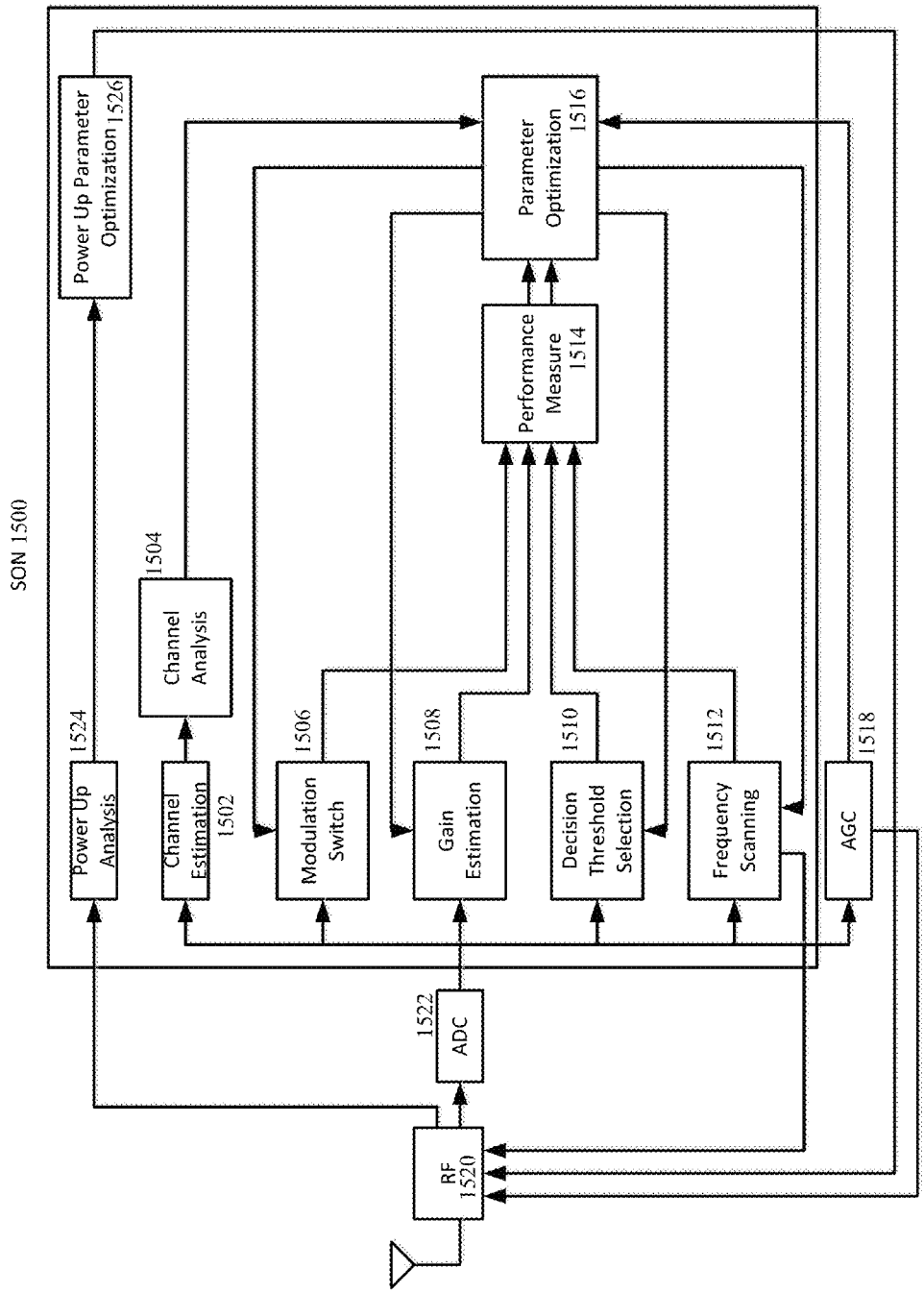
FIG. 15 is a block diagram of a self-organizing network controller.

Referring now to FIG. 15, a detail block diagram of an example SON controller (1500) is shown. A SON controller (1500) may include additional or fewer components that are illustrated in FIG. 4. The example SON controller (1500) includes channel estimation component (1502) and/or channel analysis component (1504), modulation switching component (1506), transmitter/receiver (Tx/Rx) gain estimation component (1508), decision threshold selection component (1510), carrier frequency scanning component (1512), performance measure component (1514), and parameter optimization component (1516). SON specific blocks are enclosed in a dashed box. In some scenarios, the system may have an automatic gain controller (1518) (AGC). SON controller 400 may get gain information from an AGC (1518).

Radio frequency (RF) signals from Tx/Rx receiver component (1520) may be converted into digital through analog-to-digital converter (1522) (ADC) and may feed into the SON controller (1500). To get communication channel information, i.e, characteristics of channel between transmitter and receiver, or vice versa, well known signal processing techniques may be implemented without limitation in channel estimation component (1502), such as least-square estimation, minimum mean square error (MMSE) estimation and the like. Information such as scattering, fading, signal power decay profile, and multi-path effect, may be be obtained in channel analyzer component (1504) using estimated channel properties generated by the channel estimation component (1502).

Some systems may have multiple types of modulation methods, such as frequency-shift-keying (FSK) modulation, amplitude-shift-keying (ASK) modulation, phase-shift-keying (PSK), and the like. Modulation switch component (1506) may be used to switch between different modulation methods. Each modulation method has its own advantages and disadvantages for a certain type of channel. With a system that has multiple modulation methods, it may be helpful to guarantee the best communication link if the best modulation method can be picked for a given channel.

Since for certain types of modulation methods, such as ASK, Rx/Tx gains play important role, proper gain setting is an important parameter in the configuration of an optimal communication link setup. A proper gain can be estimated by the gain estimation component (1508).

Because received signals need to be interpreted to either '1' or '0' in digital communication, decision threshold is another important parameters and is estimated by the decision threshold selection component (1510). For example, in an ASK system, amplitude threshold will determine if the received signal is '1' or '0'. In a FSK system, zero crossing may be a decision criterion.

In a noisy environment, to avoid or reduce the effect of adjacent channel interference, a carrier frequency should be selected carefully. Scanning the given frequency band by the frequency scanning component (1512) may be helpful to find a suitable carrier frequency.

With all these parameters, performance should be evaluated for the best combination. The optimal combination of parameters may be determined using performance measure component (1514) and parameter optimization component (1516). Performance measurement criteria measured by the performance measure component (1514) may be, without limitation bit error rate (BER), signal to noise ratio (SNR), and the like. If needed, multiple iterations between performance measure and parameters setting can be performed by the parameter optimization component (1516) for parameter optimization. The parameters may be feedback through the estimation, selection, and scanning components (1502-1512) in an interactive fashion.

Wireless power up parameter optimization can be done in a separate path, because it has different criteria to optimize RF energy transfer efficiency. The power up analysis component (1524) analyzes the system. Power up parameter optimization component (1526), determines optimized parameters for power up. One parameter is power up signal pattern. Power up signal pattern is a key factor not only to transfer energy wirelessly but also it is important for identification purposes. To avoid an unintended power up, each system may have an unique pattern for power up signal. The length of power up signal is another important key factor for wireless power up signal to limit interference with other systems and to minimize power consumption.

An adaptive algorithm takes the fixed beamforming process one step further and allows for the calculation of continuously updated weightings. The adaptation process may satisfy a specified optimization criterion, such as mean square error (MSE). Several examples of popular optimization techniques include least mean squares (LMS), sample matrix inversion (SMI), recursive least squares (RLS), and the constant modulus algorithm (CMA). In particular, SMI algorithm is popular due to its own advantages compared to other beamforming techniques. SMI has a faster convergence rate than others; also SMI gives a better performance in case of a block adaptive approach.

Figure 16:
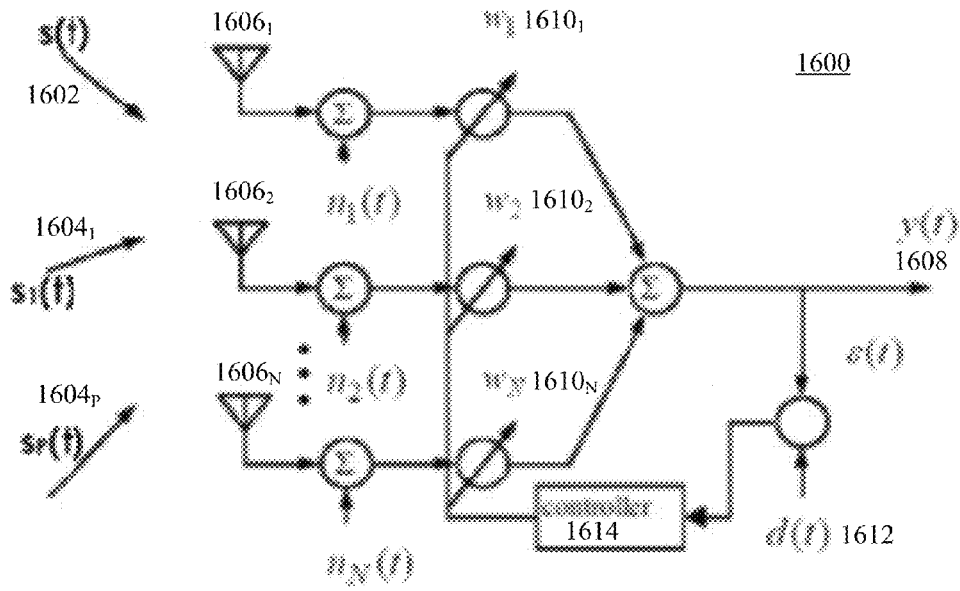
FIG. 16 is a diagram of an adaptive array system.

Referring now to FIG. 16, an example adaptive array system (1600) is shown. The signal s(t) is a desired signal (1602) and each $s_i$(t) is interference (1604). The subscript $_P$ and $_N$ represent the number of interference signals (1604) and the number of receive antennas (1606) respectively. The output of the array y(t) (1608) with variable element weights (1610) is the weighted sum of the received signals s(t) and $s_i$(t) at the array elements and the noise n(t) at the receivers connected to each element. For the received vector x(t), this process is like following equation.

$$y = w^H x \qquad \text{Equation (1)}$$

where $$x = hs + \Sigma_{i=1}^{P} h_i s_i + n \qquad \text{Equation (2)}$$

h and $h_i$ represent the N×1 channel vectors. The weights vector w is computed based on the array output y(t) (1608), a reference signal d(t) (1612) that approximates the desired signal (1602), and previous weights. The reference signal (1612) is approximated to the desired signal (1602) using a training sequence or a spreading code, which is known at the receiver. Controller (1614) calculates error signal that is the difference between received signal and desired signal and computes w, and updates variable element weights (1610) accordingly.

To compute w, minimum mean square error (MMSE) technique is first applied.

$$e = d - y \qquad \text{Equation (3)}$$

$$|e|^2 = |d|^2 - 2w^H d^* x + w^H x x^H w \qquad \text{Equation (4)}$$

$$E|e|^2 = E|d|^2 - 2w^H r_x + w^H R_{xx} w \qquad \text{Equation (5)}$$

$$w = R_{xx}^{-1} r_x \qquad \text{Equation (6)}$$

In general, the signal statistics will not be known and one may estimate the array correlation matrix $R_{xx}$ and the signal correlation vector $r_x$ over a range of snapshots or for each instant in time. The matrix and the vector may be estimated by calculation the time average such that $$\hat{R}_{xx} = \frac{1}{K} \sum_{k=1}^{K} x(k) x^H(k) \qquad \text{Equation (7)}$$

and $$\hat{r}_x = \frac{1}{K} \sum_{k=1}^{K} d^*(k) x(k) \qquad \text{Equation (8)}$$

where K is the observation interval.

The signal to interference and noise ratio (SINR) technique can also be applied. The SINR of output of the array y is defined by the following equation.

$$SINR = \frac{w^H h h^H w}{w^H \left( \sum_{p=1}^{I} h_p h_p^H = \sigma_n^2 I \right) w} = \frac{w^H h h^H w}{w^H R w} \qquad \text{Equation (9)}$$

The weight vector w to maximize above SINR is $w = R^{-1} h$, and the matrix R can be estimated from following sample matrix.

$$\hat{R}_{xx} = \frac{1}{K}\sum_{k=1}^{K} x(k)x^H(k) - \left(\frac{1}{K}\sum_{k=1}^{K} d^*(k)x(k)\right)\left(\frac{1}{K}\sum_{k=1}^{K} d^*(k)x(k)\right)^H \quad \text{Equation (10)}$$

Figure 17:
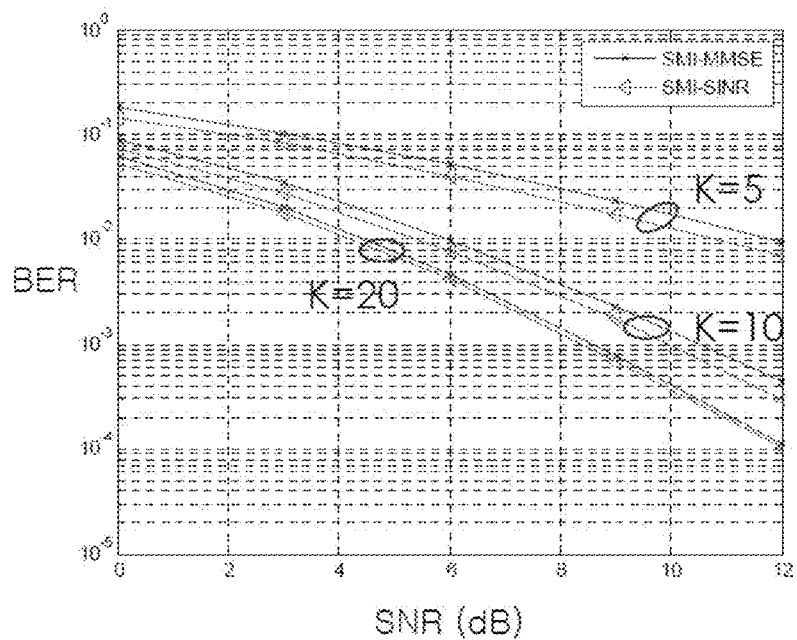
FIG. 17 is a graph comparing minimum mean square error (MMSE) and signal to interference and noise ratio (SINR) as techniques for performing sample matrix inversion (SMI)
Figure 18:
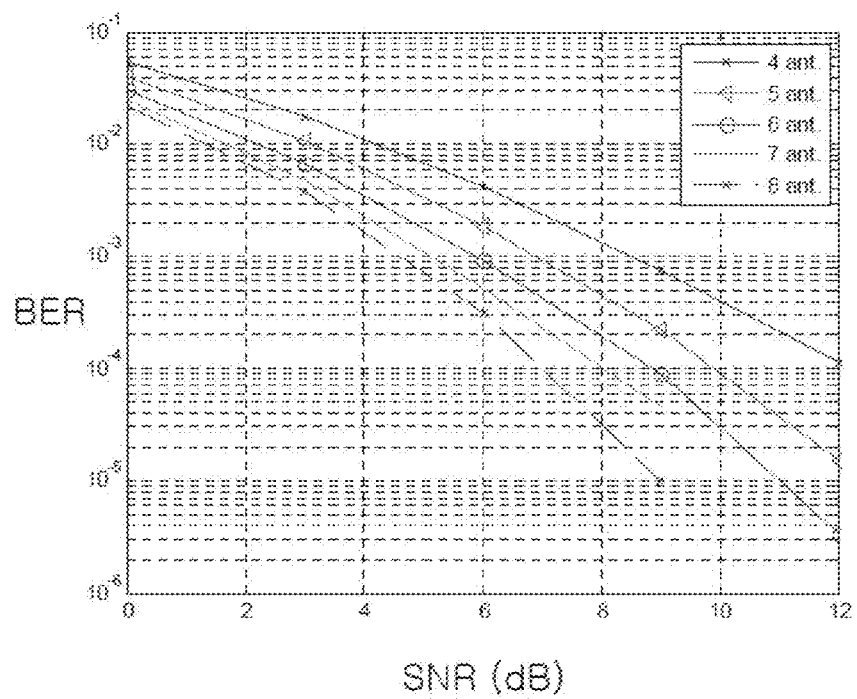
FIG. 18 is a graph showing the bit error rate (BER) for various numbers of antennas.

Referring to FIG. 17, a graph is shown indicating that the SINR method performs well compared to MMSE method. But, the results are based on the assumption of the perfect knowledge of channel state information at the receiver side. If we do not know the channel state information perfectly, we can guess that the MMSE SMI method is more practical than the SINR technique. FIG. 18 is the BER result for the different master station antenna cases. For the following simulation results, signal to interference ratio (SIR) is set to 15 dB.

Least Mean Squares (LMS) and Maximum Ration Combining (MRC) Algorithms. Note that the SMI algorithm in the previous section involves N×N matrix inversion where N can be up to 54, which may have large complexity. If the SMI algorithm may be too complex for the BMS mater, an alternative algorithm based LMS can be used. Among many different versions of LMS algorithms, the Normalized LMS (NLMS) algorithm is chosen. The NLMS algorithm is summarized as $$w(n+1) = w(n) + \frac{\mu}{\varepsilon + \|x\|^2} e^*(n)x(n) \quad \text{Equation (11)}$$

where $e(n)=d(n)-y(n)$, and $y(n)=w(n)^H x(n)$

Figure 19:
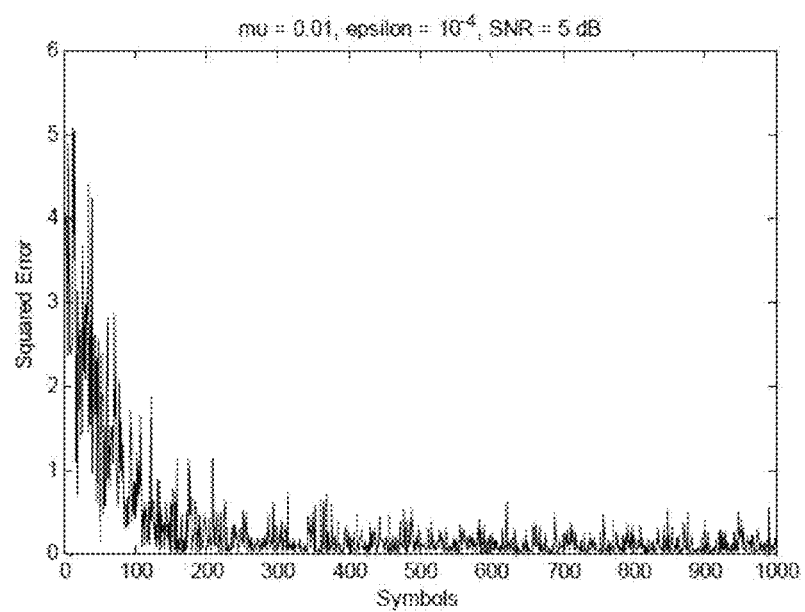
FIG. 19 is a graph showing an example of a lowest mean square (LMS) convergence for an additive white Gaussian noise (AWGN) channel.

In simulations, the step size ($\mu$) is set to 0.01, and the regularization parameter ($\varepsilon$) is set to $10^{-4}$. For the step size of 0.01, the NLMS algorithm takes 200-300 symbols to converge, which was verified empirically as shown in FIG. 19. From FIG. 19, it can be observed that the algorithm converges in about 300 pilot symbols.

As a strong alternative to the LMS algorithm, the maximal ratio combining (MRC) algorithm is a preferred algorithm which maximizes the received SNR in AWGN channels. It also has the lowest complexity because only channel estimation for each is used to compute the MRC beamforming weight. The MRC beamforming weight vector is given by $$w = \hat{h}^H \quad \text{Equation (13)}$$

where $\hat{h}$ is the channel estimate vector $$\hat{h} = \frac{1}{N}\sum_{n=1}^{N} x(n)d^*(n)$$

where $x(n)$ is the $n^{th}$ received vector at the $n^{th}$ symbol, and $d(n)$ is the $n^{th}$ pilot symbol, and N is the number of observation windows.

Figure 20:
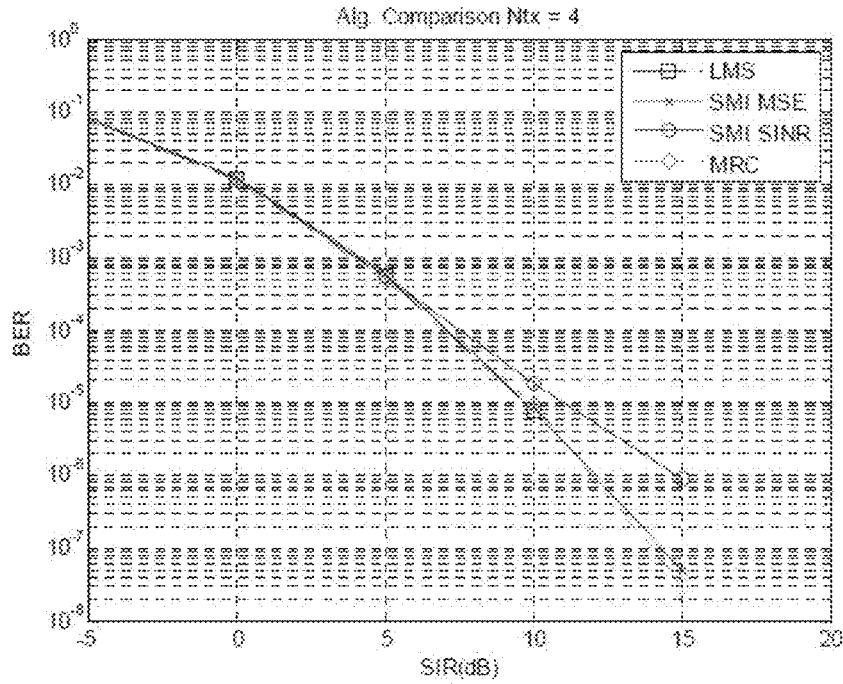
FIG. 20 is a graph showing a comparison between LMS, SMI-MMSE, SMI,-SINR, and maximum ratio combining (MRC) algorithms in an AWGN channel.

FIG. 20 shows the performance comparison between LMS, SMI-MSE, SMI-SINR, and MRC algorithm. The simulations use an AWGN channel without any interfering users. It should be noted that the LMS algorithm uses different number of pilot symbols than the other 3 algorithms (SMI-MSE, SMI-SINR, and MRC). Since the LMS algorithm is an iterative algorithm, long pilot sequences may be used so that the number of pilot symbols for the LMS algorithm is 1000. The other 3 algorithms use 100 as the number of pilot symbols.

As mentioned before, the MRC algorithm is optimal in terms of SNR for an AWGN channel (without interference), and FIG. 19 also shows that the MRC algorithm has the best BER. It is also observed that LMS, SMI-MSE, and MRC have similar BER performance. But SMI-SINR has slightly worse BER performance at high SNR regime, which is due to the estimation error of the autocorrelation matrix $\hat{R}$. Note that MRC and LMS have low complexity, and SMI-MSE and SMI-SINR have high complexity in terms of implementation.

Figure 21:
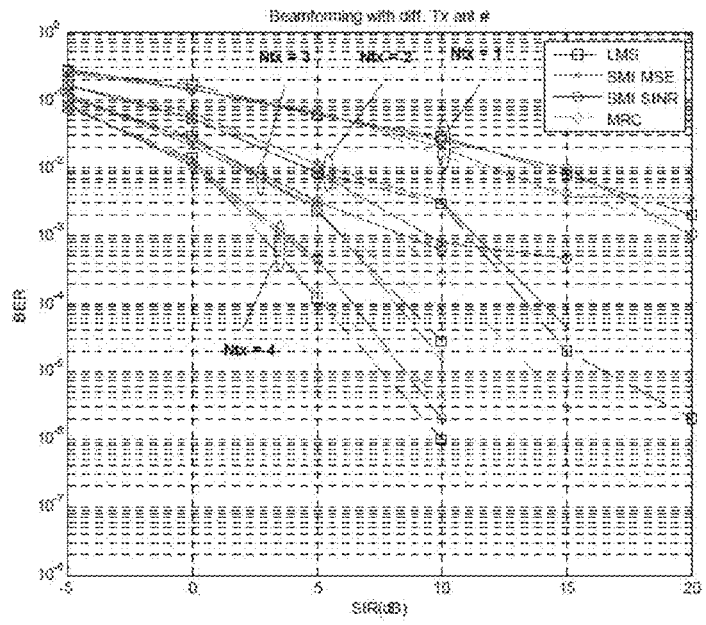
FIG. 21 is a graph showing a comparison between different number of master antennas for LMS, SMI-MMSE, SMI-SINR, and MRC algorithms.

A simulation study using the above 4 algorithms (in FIG. 20) was performed different number of BMS antennas (Ntx). FIG. 21 shows the simulation results for different number of antennas. The results of FIG. 21 are summarized in Table 1 in terms of SNR gain due to multiple antennas.

TABLE 1

| SNR gain by using multiple antennas at BER = $10^{-3}$ using LMS algorithm. | | | | |
|---|---|---|---|---|
| | Ntx = 1 (single ant) | Ntx = 2 | Ntx = 3 | Ntx = 4 |
| Gain over single ant. | 0 dB | 10 dB | 16 dB | 19.5 dB |

For the following two sections, fixed-point simulations are described for both LMS and MRC algorithms. To simplify the simulations, we use fixed point conversion only for the beamforming weight vectors and received signal (which is multiplied by the beamforming vector). Note that the following notion for fixed point data representation <t, n, m> where t is the signed bit flag (1: signed, 0: unsigned), n is the total number of bits, and m is the number of fractional bits. Note that m fractional bits can also be called Q<m> (e.g., when m=7, we say that Q7 arithmetic is used).

Figure 22:
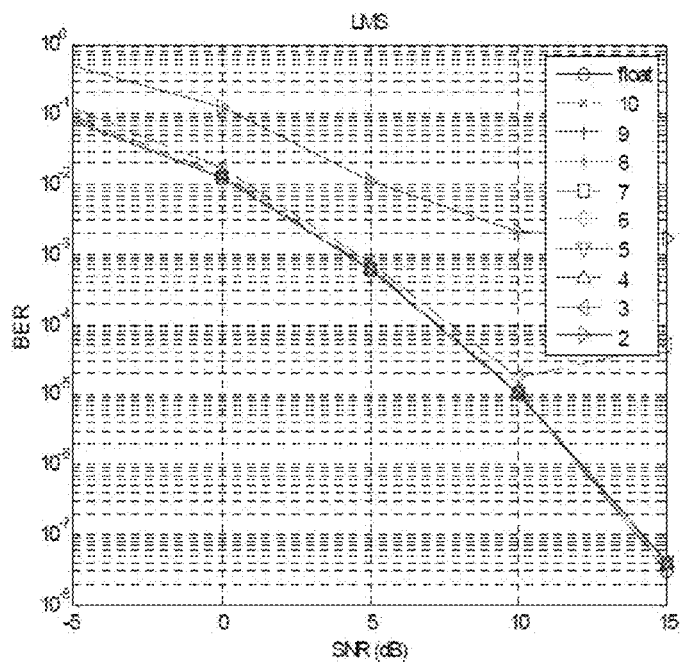
FIG. 22 is a graph showing fixed point LMS BER performance for different beamforming weight bit widths.

FIG. 22 shows the fixed point simulation results for the LMS algorithm when <1, 10, 7> (Q7) is used for the received signal, and <1, m, m-1> (m=2, . . . , 10) is used for the beamforming weight. It is observed that there is less than 0.1 dB degradation from the floating point BER at $10^{-5}$ when 4 bits (<1,4,3> Q3) are used for the beamforming weight.

Figure 23:
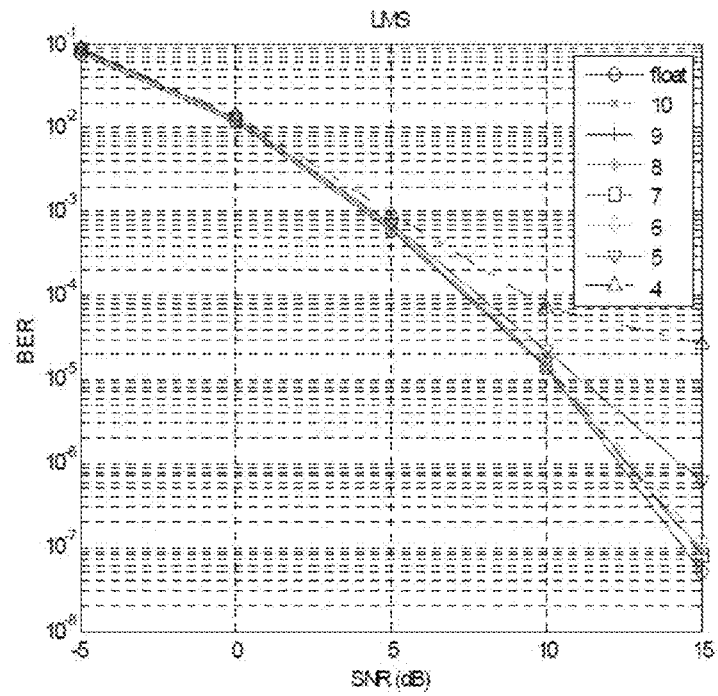
FIG. 23 is a graph showing fixed point LMS BER performance for different received signal bit widths.

FIG. 23 shows the fixed point simulation results when <1, 4, 3> (Q3) is used for the beamforming weight, and <1, m, m-3> (m=4, . . . , 10) is used for the received signal. It is also observed that there is less than 0.1 dB degradation from the floating point BER at $10^{-5}$ when 6 bits (<1,6,3> Q3) are used for the received signal.

From the FIGS. 22 and 23, negligible BER degradation results from the floating point case when 4 bits (<1,4,3> Q3) are used for the beamforming weight vector, and 6 bits (<1,6,3> Q3) are used for the received signal.

Similar results are obtained for the MRC algorithm in terms of desirable fixed point bit width.

Figure 24:
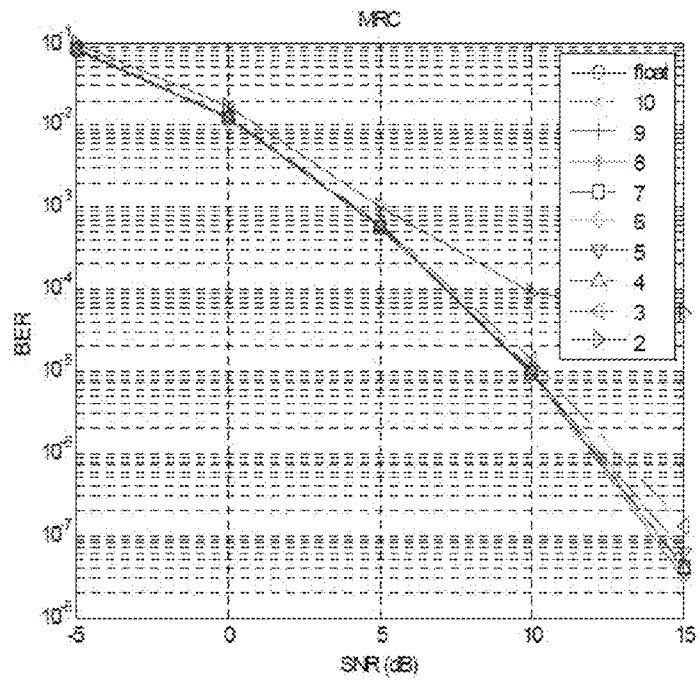
FIG. 24 is a graph showing fixed point MRC BER performance for different beamforming bit widths.

FIG. 24 shows the fixed point simulation results when <1, 10, 7> (Q7) is used for the received signal, and <1, m, m-1> (m=2, . . . , 10) is used for the beamforming weight. It is observed that there is less than 0.1 dB degradation from the floating point BER at 10-5 when 4 bits (<1,4,3> Q3) are used for the beamforming weight.

Figure 25:
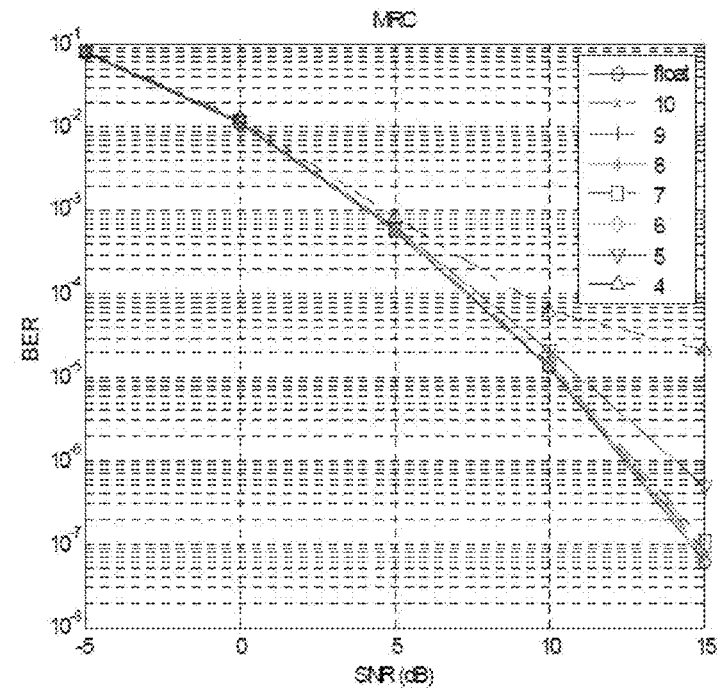
FIG. 25 is a graph showing fixed point MRC BER performance for different received signal bandwidths.

FIG. 25 shows the fixed point simulation results when <1, 4, 3> (Q3) is used for the beamforming weight, and <1, m, m-3> (m=4, . . . , 10) is used for the received signal. It is also observed that there is less than 0.1 dB degradation from the floating point BER at 10-5 when 6 bits (<1,6,3> Q3) are used for the received signal.

From FIGS. 24 and 25, negligible BER degradation results from the floating point case when 4 bits (<1,4,3> Q3) are used for the beamforming weight vector, and 6 bits (<1,6,3> Q3) are used for the received signal.

From the fixed point simulations for the LMS and the MRC algorithms, it is observed that the preferred bit widths are 4 bits (<1,4,3> Q3) for the beamforming weight vector, and 6 bits (<1,6,3> Q3) for the received signal.

Beamforming also can be used for wireless power up to maximize power transfer efficiency. As described previously, beamforming in communication measures signal to noise ratio (SNR) and configure weight factor to maximize SNR. But if SNR is replaced by a power transfer rate, beamforming technique can optimize wireless power up system. During a power up sequence, the set of configuration that is optimized for maximum power transfer rate can be used. In normal communication process, the communication optimized configuration can be used to improve communication performance.

The described systems and methods advantageously optimize a signal within a number of different wireless systems, including wireless battery management system (BMS), light emitting diode (LED) controller, photovoltaic (PV) applications, and the like. The system will work in any application that includes multiple independent constituents capable of communicating with one another for coordinated action.

In summary, there are several important and unique differences between the WiBaAN of the present invention and other wireless battery monitoring systems. First, the WiBaAN of the present invention involves a unique time-division half-duplex wireless data communication technique employing a frequency-agile, variable data-rate, self-maintaining RF radio architecture. Second, interactions between a BMS controller and a plurality of battery sensors can easily monitor and collect the data of each battery cell's condition, control the charge balancing and bypassing of each battery cell, and maintain a wireless link with a closed control loop. Also, according to the present invention, WiBaAN can be extended to a hierarchical tree architecture so as to handle thousands battery cells in specific applications. Moreover, while the cost for other wireless systems would not be tolerable for cost-sensitive large-scale battery applications, the present invention provides a very cost-effective, single-chip solution. Accordingly, the wireless battery area network (WiBaAN) architecture of the present invention will substantially reduce the cost of Li-Ion battery packs while reliably improving scalability.

While the invention has been described with reference to the preferred embodiment thereof it will be appreciated by those skilled in the art that various modifications can be made to the parts and methods that comprise the invention without departing from the spirit and scope thereof.

The invention claimed is:

1. A wireless battery area network (WiBaAN) system for intelligent battery pack management comprising:
    a plurality of master battery management units (M-BMUs);
    a plurality of sensor battery management units (S-BMUs) each connected to at least one corresponding battery cell and at least one sensor configured to monitor said at least one corresponding battery cell, wherein each of said plurality of S-BMUs is connected to at least one of the plurality of M-BMUs by a first wireless mode;
    at least one top level battery management unit (T-BMU) configured to control the operations of the plurality of M-BMUs, wherein said at least one T-BMU is wirelessly connected to each the plurality of M-BMUs by a second wireless mode;
    at least one communications controller configured to estimate characteristics of a communication channel used by at least one of the first and second wireless modes, and to determine an optimal set of parameters which minimize noise and interference; and
    a secondary protection module wirelessly receiving at least one fault signal from at least one S-BMU from the plurality of S-BMUs;
    wherein at least a first S-BMU of the plurality of S-BMUs is wirelessly connected with at least one second S-BMU in a mesh network such that at least a first M-BMU of the plurality of M-BMUs is able to communicate with the first S-BMU via the second S-BMU.

2. The system of claim h wherein the parameters that are optimized by the at least one communications controller include at least one of a modulation method, a carrier frequency, a frequency deviation, a signal bandwidth, a transmitter gain setting, a receiver gain setting, a transmitter filter setting, and a receiver filter setting.

3. The system of claim h further comprising:
    a rebalancing module connected to a plurality of battery cells for rebalancing a charge between the plurality of battery cells;
    wherein an excess charge is automatically redistributed from a first individual battery of the plurality of battery cells to a second individual battery of the plurality of battery cells upon the first individual battery reaching approximately a first maximum charge and wherein the second individual battery is under a second maximum charge.

4. The system of claim 3 wherein the first maximum charge and the second maximum charge are equal.

5. The system of claim 3 wherein the rebalancing module disconnects at least one battery cell of the plurality of battery cells from the plurality of battery cells from the system.

6. The system of claim 1, wherein the secondary protection module wirelessly receives the at least one fault signal from the at least one S-BMU when at least one M-BMU from the plurality of M-BMUs is not responsive to the at least one fault signal.

7. The system of claim k wherein the secondary protection module is configured to operates independently from the plurality of M-BMUs.

8. The system of claim k wherein the at least one fault signal includes at least one of an indication of over voltage of at least one battery cell and an indication of under voltage of at least one battery cell.

9. The system of claim k wherein the secondary protection module is wirelessly connected to the plurality of S-BMUs through a third diverse wireless connection comprised of at least one of frequency diversity, time diversity, spatial diversity, and modulation diversity.

10. The system of claim 9, wherein the third wireless mode is distinct from the first wireless mode and the second wireless mode.

11. The system of claim h wherein a plurality of battery cells is housed in a metal case and each of the plurality of S-BMUs is respectively mounted directly on said corresponding battery cell.

12. The system of claim h wherein the at least one sensor measures a condition of a plurality of battery cells, the condition being selected from the group consisting of voltage, current, impedance and temperature.

13. The system of claim 1, wherein at least one S-BMU of the plurality of S-BMUs is integrated on a single chip.

14. The system of claim 13 wherein the at least one S-BMU that is integrated on a single chip further includes one analog-to-digital converter for each sensor included in the at least one S-BMU and a digital multiplexer for combining the signals from each analog-to-digital convertor included on the at least one S-BMU.

15. A wireless battery area network (WiBaAN) system for intelligent battery pack management comprising:
- a plurality of master battery management units (M-BMU);
- a plurality of sensor battery management units (S-BMU) each connected to at least one corresponding battery cell and at least one sensor configured to monitor said at least one corresponding battery cell, wherein each of said S-BMUs is connected to at least one of the plurality of M-BMUs by a first wireless mode;
- at least one top level battery management unit (T-BMU) configured to control the operations of the plurality of M-BMUs, wherein said at least one T-BMU is wirelessly connected to each the plurality of M-BMUs by a second wireless mode; and
- at least one communications controller configured to estimate characteristics of a communication channel used by at least one of the first and second wireless modes, and to determine an optimal set of parameters which minimize noise and interference;
- wherein the plurality of battery cells are housed in a metal case and wherein each of the plurality of S-BMUs is respectively mounted directly on said corresponding battery cell;
- wherein at least one wireless repeater is configured to facilitate wireless communication between the plurality of S-BMUs inside the metal case and at least one M-BMU of the plurality of M-BMUs using the first wireless mode whereby a wireless range of the plurality S-BMUs is extended.

16. A wireless battery area network (WiBaAN) system for intelligent battery pack management comprising:
- a plurality of master battery management units (M-BMU);
- a plurality of sensor battery management units (S-BMU) each connected to at least one corresponding battery cell and at least one sensor configured to monitor said at least one corresponding battery cell, wherein each of said S-BMUs is connected to at least one of the plurality of M-BMUs by a first wireless mode;
- at least one top level battery management unit (T-BMU) configured to control the operations of the plurality of M-BMUs, wherein said at least one T-BMU is wirelessly connected to each the plurality of M-BMUs by a second wireless mode;
- at least one communications controller configured to estimate characteristics of a communication channel used by at least one of the first and second wireless modes, and to determine an optimal set of parameters which minimize noise and interference;
- a secondary protection module configured to wirelessly receive at least one fault signal from at least one S-BMU from the plurality of S-BMUs, wherein the secondary protection module is configured to wirelessly receive the at least one fault signal when at least one M-BMU from the plurality of M-BMUs is not responsive to the at least one fault signal from the at least one S-BMU from the plurality of S-BMUs;
- wherein the secondary protection module is wirelessly connected to the plurality of S-BMUs through a third diverse wireless connection comprised of at least one of frequency diversity, time diversity, spatial diversity, and modulation diversity; and
- wherein each of the plurality of S-BMUs is wirelessly connected with at least one other S-BMU in a mesh network such that each of the plurality M-BMUs is able to communicate with a first S-BMU by communicating with a second S-BMU that is in communication with the first S-BMU.

17. The system of claim 16, wherein the mesh network of S-BMUs comprises a fourth diverse wireless mode.

18. The system of claim 17, wherein the fourth diverse wireless mode is the same as the first wireless mode.

19. The system of claim 17, wherein the fourth diverse wireless mode is distinct from the first wireless mode, the second wireless mode, and the third wireless mode.

* * * * *